(12) United States Patent (10) Patent No.: US 9,880,974 B2
Chen et al. (45) Date of Patent: Jan. 30, 2018

(54) FOLDED BUTTERFLY MODULE, PIPELINED FFT PROCESSOR USING THE SAME, AND CONTROL METHOD OF THE SAME

(71) Applicant: NATIONAL CHIAO TUNG UNIVERSITY, Hsinchu (TW)

(72) Inventors: Sau-Gee Chen, Hsinchu (TW); Bo-Wei Wang, Taipei (TW); Shen-Jui Huang, Zhubei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 284 days.

(21) Appl. No.: 14/741,805

(22) Filed: Jun. 17, 2015

(65) Prior Publication Data
US 2016/0092399 A1 Mar. 31, 2016

(30) Foreign Application Priority Data
Sep. 26, 2014 (TW) .............................. 103133579 A

(51) Int. Cl.
*G06F 17/14* (2006.01)
(52) U.S. Cl.
CPC .................................. *G06F 17/142* (2013.01)
(58) Field of Classification Search
CPC ........................................................ G06F 9/3875
USPC ........................................ 708/233, 400–409
See application file for complete search history.

(56) References Cited

U.S. PATENT DOCUMENTS

| 6,098,088 A * | 8/2000 | He | G06F 17/142 |
| | | | 708/406 |
| 8,275,820 B2 * | 9/2012 | Jhang | G01S 19/254 |
| | | | 708/404 |
| 2004/0001557 A1 * | 1/2004 | Sunwoo | G06F 17/142 |
| | | | 375/295 |
| 2005/0114420 A1 | 5/2005 | Gibb et al. | |
| 2012/0041996 A1 | 2/2012 | Ayinala et al. | |

OTHER PUBLICATIONS

Arvind ("Folding and Pipelining complex combinational circuits" by Computer Science & Artificial Intelligence Lab Massachusetts Institute of Technology, on Feb. 22, 2012, URL: http://csg.csail.mit.edu/6.S078/6_S078_2012_www/handouts/lectures/L05-PipeliningCombCktsPrint.pdf).*

(Continued)

*Primary Examiner* — Tan V. Mai
(74) *Attorney, Agent, or Firm* — Nixon & Vanderhye PC

(57) ABSTRACT

A folded butterfly module performs a radix-$2^2$ butterfly operation, and includes: a buffer operable to store first and second to-be-stored data and output first and second stored data; a first multiplexer operable to output one of the second stored data and input data as first selection data; a butterfly operator performing a radix-2 butterfly operation on the first stored data and the first selection data to generate operation data and the second to-be-stored data; a second multiplexer operable to output one of the input data and the operation data as the first to-be-stored data; a third multiplexer operable to output one of the operation data and the second stored data as second selection data; and a multiplier generating output data that equal a product of the second selection data and twiddle data.

10 Claims, 22 Drawing Sheets

(56) References Cited

OTHER PUBLICATIONS

Y.W. Lin, et al., "A 1-GS/s FFT/IFFT Processor for UWB Applications," IEEE Journal of Solid-State Circuits, vol. 40, No. 8, Aug. 2005, pp. 1726-1735.

Thomas Lenart and Viktor Öwall, "A Pipelined FFT Processor Using Data Scaling with Reduced Memory Requirements;" In Proc. NORCHIP, 2002.

* cited by examiner

| clock cycle | T0 | T1 | T2 | T3 | T4 | T5 | T6 | T7 | T8 | T9 | T10 | T11 | T12 | T13 | T14 | T15 |
|---|---|---|---|---|---|---|---|---|---|---|---|---|---|---|---|---|
| Din | x(0)~x(3) | x(4)~x(7) | x(8)~x(11) | x(12)~x(15) | x(16)~x(19) | x(20)~x(23) | x(24)~x(27) | x(28)~x(31) | x(32)~x(35) | x(36)~x(39) | x(40)~x(43) | x(44)~x(47) | x(48)~x(51) | x(52)~x(55) | x(56)~x(59) | x(60)~x(63) |
| 311 | W0 Din | W1 Din | W1 Din | W1 Din | W2 Din | W2 Din | W3 Din | W3 Din | W4 Din | W4 Din | W5 Din | W5 Din | W6 Din | W6 Din | W7 Din | R0 Dbo |
| 312 | | W0 Din | | | | | | | | | | | | | | W7 Din |
| Dop1 | | | | | | | | | | | | | | | | |
| Dop2 | | | | | | | | | | | | | | | | |
| Dout | | | | | | | | | | | | | | | | |

FIG.10

| clock cycle | T16 | T17 | T18 | T19 | T20 | T21 | T22 | T23 | T24 | T25 | T26 | T27 | T28 | T29 | T30 | T31 |
|---|---|---|---|---|---|---|---|---|---|---|---|---|---|---|---|---|
| Din | x(64)~x(67) | x(68)~x(71) | x(72)~x(75) | x(76)~x(79) | x(80)~x(83) | x(84)~x(87) | x(88)~x(91) | x(92)~x(95) | x(96)~x(99) | x(100)~x(103) | x(104)~x(107) | x(108)~x(111) | x(112)~x(115) | x(116)~x(119) | x(120)~x(123) | x(124)~x(127) |
| | | | | | | | | first symbol | | | | | | | | |
| 311 | W0 Dop2 | R1 Dbo | W1 Dop2 | R2 Dbo | W2 Dop2 | R3 Dbo | W3 Dop2 | R4 Dbo | W4 Dop2 | R5 Dbo | W5 Dop2 | R6 Dbo | W6 Dop2 | R7 Dbo | W7 Dop2 | R0 Dbo |
| 312 | R0 Dbo | W0 Dop2 | R1 Dbo | W1 Dop2 | R2 Dbo | W2 Dop2 | R3 Dbo | W3 Dop2 | R4 Dbo | W4 Dop2 | R5 Dbo | W5 Dop2 | R6 Dbo | W6 Dop2 | R7 Dbo | W7 Dop2 |
| | | | | | | | | | first symbol | | | | | | | |
| Dop1 | f(0)~f(3) | f(4)~f(7) | f(8)~f(11) | f(12)~f(15) | f(16)~f(19) | f(20)~f(23) | f(24)~f(27) | f(28)~f(31) | f(32)~f(35) | f(36)~f(39) | f(40)~f(43) | f(44)~f(47) | f(48)~f(51) | f(52)~f(55) | f(56)~f(59) | f(60)~f(63) |
| | | | | | | | | | | first symbol | | | | | | |
| Dop2 | f(64)~f(67) | f(68)~f(71) | f(72)~f(75) | f(76)~f(79) | f(80)~f(83) | f(84)~f(87) | f(88)~f(91) | f(92)~f(95) | f(96)~f(99) | f(100)~f(103) | f(104)~f(107) | f(108)~f(111) | f(112)~f(115) | f(116)~f(119) | f(120)~f(123) | f(124)~f(127) |
| | | | | | | | | | | first symbol | | | | | | |
| Dout | a(0)~a(3) | a(4)~a(7) | a(8)~a(11) | a(12)~a(15) | a(16)~a(19) | a(20)~a(23) | a(24)~a(27) | a(28)~a(31) | a(32)~a(35) | a(36)~a(39) | a(40)~a(43) | a(44)~a(47) | a(48)~a(51) | a(52)~a(55) | a(56)~a(59) | a(60)~a(63) |

FIG.11

| clock cycle | T32 | T33 | T34 | T35 | T36 | T37 | T38 | T39 | T40 | T41 | T42 | T43 | T44 | T45 | T46 | T47 |
|---|---|---|---|---|---|---|---|---|---|---|---|---|---|---|---|---|
| Din | x(0)~x(3) | x(4)~x(7) | x(8)~x(11) | x(12)~x(15) | x(16)~x(19) | x(20)~x(23) | x(24)~x(27) | x(28)~x(31) | x(32)~x(35) | x(36)~x(39) | x(40)~x(43) | x(44)~x(47) | x(48)~x(51) | x(52)~x(55) | x(56)~x(59) | x(60)~x(63) |
| 311 | W0 Din | R1 Dbo | W1 Din | R2 Dbo | W2 Din | R3 Dbo | W3 Din | R4 Dbo | W4 Din | R5 Dbo | W5 Din | R6 Dbo | W6 Din | R7 Dbo | W7 Din | R0 Dbo |
| 312 | R0 Dbo | W0 Din | R1 Dbo | W1 Din | R2 Dbo | W2 Din | R3 Dbo | W3 Din | R4 Dbo | W4 Din | R5 Dbo | W5 Din | R6 Dbo | W6 Din | R7 Dbo | W7 Din |
| Dop1 | | | | | | | | | | | | | | | | |
| Dop2 | | | | | | | | | | | | | | | | |
| Dout | a(64)~a(67) | a(68)~a(71) | a(72)~a(75) | a(76)~a(79) | a(80)~a(83) | a(84)~a(87) | a(88)~a(91) | a(92)~a(95) | a(96)~a(99) | a(100)~a(103) | a(104)~a(107) | a(108)~a(111) | a(112)~a(115) | a(116)~a(119) | a(120)~a(123) | a(124)~a(127) | second symbol (T36–T47 upper); first symbol (T32–T47 Dout)

| clock cycle | T16 | T17 | T18 | T19 | T20 | T21 | T22 | T23 | T24 | T25 | T26 | T27 | T28 | T29 | T30 | T31 |
|---|---|---|---|---|---|---|---|---|---|---|---|---|---|---|---|---|
| Din | a(0)~a(3) | a(4)~a(7) | a(8)~a(11) | a(12)~a(15) | a(16)~a(19) | a(20)~a(23) | a(24)~a(27) | a(28)~a(31) | a(32)~a(35) | a(36)~a(39) | a(40)~a(43) | a(44)~a(47) | a(48)~a(51) | a(52)~a(55) | a(56)~a(59) | a(60)~a(63) |
|  | first symbol (first group) | | | | | | | | | | | | | | | |
| 111 | W0 Din |  | W1 Din |  |  |  |  | R0 Dbo1 | W0 Dop | R1 Dbo1 | W1 Dop |  |  |  | W3 Dbi2 | R0 Dbi2 |
| 112 |  | W0 Din |  | W1 Din |  |  |  |  | R0 Dbo1 | W0 Dop | R1 Dbo1 | W1 Dop |  | W2 Dbi2 |  | W3 Dbi2 |
| 113 |  |  |  |  | W0 Din |  | W1 Din |  | W2 Dbi2 |  | W3 Dbi2 | R0 Dbo1 | W0 Dop | R1 Dbo1 | W1 Dop | R0 Dbo2 |
| 114 |  |  |  |  |  | W0 Din |  | W1 Din |  | W2 Dbi2 |  | W3 Dbi2 | R0 Dbo1 | W0 Dop | R1 Dbo1 | W1 Dop |
| Dop |  |  |  |  |  |  |  |  | i(0)~i(3) | i(4)~i(7) | i(8)~i(11) | i(12)~i(15) | i(16)~i(19) | i(20)~i(23) | i(24)~i(27) | i(28)~i(31) |
|  | | | | | | | | | | | first symbol (first group) | | | | | |
| Dbi2 |  |  |  |  |  |  |  |  | i(32)~i(35) | i(36)~i(39) | i(40)~i(43) | i(44)~i(47) | i(48)~i(51) | i(52)~i(55) | i(56)~i(59) | i(60)~i(63) |
|  | | | | | | | | | | | first symbol (first group) | | | | | |
| Dout |  |  |  |  |  |  |  |  |  |  |  |  |  |  |  |  |

| clock cycle | T32 | T33 | T34 | T35 | T36 | T37 | T38 | T39 | T40 | T41 | T42 | T43 | T44 | T45 | T46 | T47 |
|---|---|---|---|---|---|---|---|---|---|---|---|---|---|---|---|---|
| Din | | | | | | | first symbol (first group) | | | | | first symbol (second group) | | | | |
| | a(64)~a(67) | a(68)~a(71) | a(72)~a(75) | a(76)~a(79) | a(80)~a(83) | a(84)~a(87) | a(88)~a(91) | a(92)~a(95) | a(96)~a(99) | a(100)~a(103) | a(104)~a(107) | a(108)~a(111) | a(112)~a(115) | a(116)~a(119) | a(120)~a(123) | a(124)~a(127) |
| 111 | W0 Din | R1 Dbo1 | W1 Din | R2 Dbo2 | W2 Dbi2 | R3 Dbo2 | W3 Dbi2 | R0 Dbo1 | W0 Dop | R1 Dbo1 | W1 Dop | R2 Dbo2 | W2 Dbi2 | R3 Dbo2 | W3 Dbi2 | R1 Dbo1 |
| 112 | R0 Dbo1 | W0 Din | R1 Dbo1 | W1 Din | R2 Dbo2 | W2 Dbi2 | R3 Dbo2 | W3 Dbi2 | R0 Dbo1 | W0 Dop | R1 Dbo1 | W1 Dop | R2 Dbo2 | W2 Dbi2 | R3 Dbo2 | W3 Dbi2 |
| 113 | W0 Dbi2 | R1 Dbo2 | W1 Dbi2 | R2 Dbo1 | W2 Din | R3 Dbo1 | W3 Din | R0 Dbo2 | W0 Dbi2 | R1 Dbo2 | W1 Dbi2 | R2 Dop | W2 Dop | R3 Dop | W3 Dop | R2 Dbo2 |
| 114 | R0 Dbo2 | W0 Dbi2 | R1 Dbo2 | W1 Dbi2 | R2 Dbo1 | W2 Din | R3 Dbo1 | W3 Din | R0 Dbo2 | W0 Dbi2 | R1 Dbo2 | W1 Dbi2 | R2 Dop | W2 Dop | R3 Dop | W3 Dop |
| Dop | | | | first symbol (first group) | | | | | | | first symbol (second group) | | | | | |
| | f(0)~f(3) | f(4)~f(7) | f(8)~f(11) | f(12)~f(15) | f(32)~f(35) | f(36)~f(39) | f(40)~f(43) | f(44)~f(47) | i(64)~i(67) | i(68)~i(71) | i(72)~i(75) | i(76)~i(79) | i(80)~i(83) | i(84)~i(87) | i(88)~i(91) | i(92)~i(95) |
| Dbi2 | f(16)~f(19) | f(20)~f(23) | f(24)~f(27) | f(28)~f(31) | f(48)~f(51) | f(52)~f(55) | f(56)~f(59) | f(60)~f(63) | i(96)~i(99) | i(100)~i(103) | i(104)~i(107) | i(108)~i(111) | i(112)~i(115) | i(116)~i(119) | i(120)~i(123) | i(124)~i(127) |
| Dout | b(0)~b(3) | b(4)~b(7) | b(8)~b(11) | b(12)~b(15) | b(32)~b(35) | b(36)~b(39) | b(40)~b(43) | b(44)~b(47) | b(16)~b(19) | b(20)~b(23) | b(24)~b(27) | b(28)~b(31) | b(48)~b(51) | b(52)~b(55) | b(56)~b(59) | b(60)~b(63) |

FIG. 14

| clock cycle | T48 | T49 | T50 | T51 | T52 | T53 | T54 | T55 | T56 | T57 | T58 | T59 | T60 | T61 | T62 | T63 |
|---|---|---|---|---|---|---|---|---|---|---|---|---|---|---|---|---|
| Din | a(0)~a(3) | a(4)~a(7) | a(8)~a(11) | a(12)~a(15) | a(16)~a(19) | a(20)~a(23) | a(24)~a(27) | a(28)~a(31) | a(32)~a(35) | a(36)~a(39) | a(40)~a(43) | a(44)~a(47) | a(48)~a(51) | a(52)~a(55) | a(56)~a(59) | a(60)~a(63) |
|  | | | | | | | | second symbol (third group) | | | | | | | | |
| 111 | W0 Din | R1 Din | W1 Din | R2 Dbo2 | W2 Dbi2 | R3 Dbo2 | W3 Dbi2 | R0 Dbo1 | W0 Dop | R1 Dbo1 | W1 Dop | R2 Dbo2 | W2 Dbi2 | R3 Dbo2 | W3 Dbi2 | R0 Dbo1 |
| 112 | R0 Dbo1 | W0 Din | R1 Dbo1 | W1 Din | R2 Dbo2 | W2 Dbi2 | R3 Dbo2 | W3 Dbi2 | R0 Dbo1 | W0 Dop | R1 Dbo1 | W1 Dop | R2 Dbo2 | W2 Dbi2 | R3 Dbo2 | W3 Dbi2 |
| 113 | W2 Dbi2 | R3 Dbo2 | W3 Dbi2 | R0 Dbo1 | W0 Din | R1 Dbo1 | W1 Din | R2 Dbo2 | W2 Dbi2 | R3 Dbo2 | W3 Dbi2 | R0 Dbo1 | W0 Dop | R1 Dbo1 | W1 Dop | R0 Dbo2 |
| 114 | R2 Dbo2 | W2 Dbi2 | R3 Dbo2 | W3 Dbi2 | R0 Dbo1 | W0 Din | R1 Dbo1 | W1 Din | R2 Dbo2 | W2 Dbi2 | R3 Dbo2 | W3 Dbi2 | R0 Dbo1 | W0 Dop | R1 Dbo1 | W1 Dop |
|  | | | first symbol (second group) | | | | | second symbol (third group) | | | | | | | | |
| Dop | f(64)~f(67) | f(68)~f(71) | f(72)~f(75) | f(76)~f(79) | f(96)~f(99) | f(100)~f(103) | f(104)~f(107) | f(108)~f(111) | i(0)~i(3) | i(4)~i(7) | i(8)~i(11) | i(12)~i(15) | i(16)~i(19) | i(20)~i(23) | i(24)~i(27) | i(28)~i(31) |
|  | | | first symbol (second group) | | | | | second symbol (third group) | | | | | | | | |
| Dbi2 | f(80)~f(83) | f(84)~f(87) | f(88)~f(91) | f(92)~f(95) | f(112)~f(115) | f(116)~f(119) | f(120)~f(123) | f(124)~f(127) | i(32)~i(35) | i(36)~i(39) | i(40)~i(43) | i(44)~i(47) | i(48)~i(51) | i(52)~i(55) | i(56)~i(59) | i(60)~i(63) |
|  | | | | | | | | first symbol (second group) | | | | | | | | |
| Dout | b(64)~b(67) | b(68)~b(71) | b(72)~b(75) | b(76)~b(79) | b(96)~b(99) | b(100)~b(103) | b(104)~b(107) | b(108)~b(111) | b(80)~b(83) | b(84)~b(87) | b(88)~b(91) | b(92)~b(95) | b(112)~b(115) | b(116)~b(119) | b(120)~b(123) | b(124)~b(127) |

FIG.15

| clock cycle | T32 | T33 | T34 | T35 | T36 | T37 | T38 | T39 | T40 | T41 | T42 | T43 | T44 | T45 | T46 | T47 |
|---|---|---|---|---|---|---|---|---|---|---|---|---|---|---|---|---|
| | first symbol (first group) | | | | first symbol (second group) | | | | first symbol (third group) | | | | first symbol (fourth group) | | | |
| Din | b(0)~b(3) | b(4)~b(7) | b(8)~b(11) | b(12)~b(15) | b(32)~b(35) | b(36)~b(39) | b(40)~b(43) | b(44)~b(47) | b(16)~b(19) | b(20)~b(23) | b(24)~b(27) | b(28)~b(31) | b(48)~b(51) | b(52)~b(55) | b(56)~b(59) | b(60)~b(63) |
| 111 | W0 Din | R0 Dbo1 | W0 Dop | R0 Dbo1 | W0 Din | R0 Dbo1 | W0 Dop | R0 Dbo1 | W0 Din | R0 Dbo1 | W0 Dop | R0 Dbo1 | W0 Din | R0 Dbo1 | W0 Dop | R0 Dbo1 |
| 112 | | W Din | W Dbi2 | W Dop | W Dbi2 | | W Dbi2 | | | W Din | W Dbi2 | W Dop | W Dbi2 | | W Dbi2 | |
| 113 | | | W Dbi2 | | | W Din | | W Dop | W Dbi2 | | | | | W Din | | W Dop |
| 114 | | | | W0 Dbi2 | R0 Dbo2 | W0 Dbi2 | R0 Dbo2 | W0 Dbi2 | R0 Dbo2 | W0 Dbi2 | R0 Dbo2 | W0 Dbi2 | R0 Dbo2 | W0 Dbi2 | R0 Dbo2 | W0 Dbi2 |
| | | | | first symbol (first group) | first symbol (first group) | | | first symbol (second group) | first symbol (second group) | | | first symbol (third group) | first symbol (third group) | | | first symbol |
| Dop | | | i(0)~i(3) | i(4)~i(7) | f(0)~f(3) | f(8)~f(11) | i(32)~i(35) | i(36)~i(39) | f(32)~f(35) | f(40)~f(43) | i(16)~i(19) | i(20)~i(23) | f(16)~f(19) | f(24)~f(27) | i(48)~i(51) | i(52)~i(55) |
| | | | | | first symbol (first group) | | | first symbol (second group) | | | | first symbol (third group) | | | | first symbol |
| Dbi2 | | | i(8)~i(11) | i(12)~i(15) | f(4)~f(7) | f(12)~f(15) | i(40)~i(43) | i(44)~i(47) | f(36)~f(39) | f(44)~f(47) | i(24)~i(27) | i(28)~i(31) | f(20)~f(23) | f(28)~f(31) | i(56)~i(59) | i(60)~i(63) |
| Dout | | | | | first symbol (first group) | c(0)~c(3) | c(4)~c(7) | c(12)~c(15) | c(32)~c(35) | c(40)~c(43) | c(36)~c(39) | c(44)~c(47) | c(16)~c(19) | c(24)~c(27) | c(20)~c(23) | c(28)~c(31) |
| | | | | | c(0)~c(3) | c(8)~c(11) | | | | | | | | | | |

| clock cycle | T36 | T37 | T38 | T39 | T40 | | T66 | T67 | T68 | T69 | T70 | T71 | T72 | | T98 | T99 |
|---|---|---|---|---|---|---|---|---|---|---|---|---|---|---|---|---|
| Din | c(0) ~ c(3) | c(8) ~ c(11) | c(4) ~ c(7) | c(12) ~ c(15) | c(32) ~ c(35) | | c(116) ~ c(119) | c(124) ~ c(127) | c(0) ~ c(3) | c(8) ~ c(11) | c(4) ~ c(7) | c(12) ~ c(15) | c(32) ~ c(35) | | c(116) ~ c(119) | c(124) ~ c(127) |
| | first symbol | | | | | | | | second symbol | | | | | | | |
| Di | i(0) ~ i(3) | i(8) ~ i(11) | i(4) ~ i(7) | i(12) ~ i(15) | i(32) ~ i(35) | | i(116) ~ i(119) | i(124) ~ i(127) | i(0) ~ i(3) | i(8) ~ i(11) | i(4) ~ i(7) | i(12) ~ i(15) | i(32) ~ i(35) | | i(116) ~ i(119) | i(124) ~ i(127) |
| | first symbol | | | | | | | | second symbol | | | | | | | |
| Dout | X(0) X(64) X(32) X(96) | X(8) X(72) X(40) X(104) | X(16) X(80) X(48) X(112) | X(24) X(88) X(56) X(120) | X(4) X(68) X(36) X(100) | | X(23) X(87) X(55) X(119) | X(31) X(95) X(63) X(127) | X(0) X(64) X(32) X(96) | X(8) X(72) X(40) X(104) | X(16) X(80) X(48) X(112) | X(24) X(88) X(56) X(120) | X(4) X(68) X(36) X(100) | | X(23) X(87) X(55) X(119) | X(31) X(95) X(63) X(127) |
| | first symbol | | | | | | | | second symbol | | | | | | | |

FIG.19

FOLDED BUTTERFLY MODULE, PIPELINED FFT PROCESSOR USING THE SAME, AND CONTROL METHOD OF THE SAME

CROSS-REFERENCE TO RELATED APPLICATION

This application claims priority of Taiwanese Application No. 103133579, filed on Sep. 26, 2014.

FIELD OF THE INVENTION

This invention relates to fast Fourier transform (FFT) techniques, and more particularly to a folded butterfly module, a pipelined FFT processor using the same, and a control method of the same.

BACKGROUND OF THE INVENTION

Although a conventional pipelined fast Fourier transform (FFT) processor has the advantage of high throughput, it is disadvantageous in that utilization of butterfly units thereof is low. Therefore, how to increase the utilization of the butterfly units while maintaining a high throughput is important.

SUMMARY OF THE INVENTION

Therefore, an object of this invention is to provide a folded butterfly module, a pipelined fast Fourier transform (FFT) processor using the same, and a control method of the same, that can overcome the aforesaid drawback associated with the prior art.

According to one aspect of this invention, there is provided a folded butterfly module adapted to perform a radix-$2^2$ butterfly operation. The folded butterfly module includes a buffer, a first multiplexer, a butterfly operator, a second multiplexer, a third multiplexer and a multiplier. The buffer receives first to-be-stored data and second to-be-stored data, and is operable to store the first and second to-be-stored data and to output first stored data and second stored data. The first multiplexer is coupled to the buffer for receiving the second stored data therefrom, adapted to receive input data, and operable to output one of the second stored data and the input data as first selection data. The butterfly operator is coupled to the buffer and the first multiplexer for receiving the first stored data and the first selection data respectively therefrom, and performs a radix-2 butterfly operation on the first stored data and the first selection data to generate operation data and the second to-be-stored data. The second multiplexer is coupled to the butterfly operator and the buffer, is adapted to receive the input data, receives the operation data from the butterfly operator, and is operable to output one of the input data and the operation data as the first to-be-stored data. The third multiplexer is coupled to the butterfly operator and the buffer for receiving the operation data and the second stored data respectively therefrom, and operable to output one of the operation data and the second stored data as second selection data. The multiplier is coupled to the third multiplexer for receiving the second selection data therefrom, and generates output data that equals a product of the second selection data and predetermined twiddle data.

According to another aspect of this invention, there is provided a pipelined FFT processor adapted to perform an N-point FFT, where $N=2^K$ and K is an integer larger than or equal to four. The pipelined FFT processor includes a number (M) of cascaded butterfly modules. When K is an even number, $M=K/2$, each of the butterfly modules performs a radix-$2^2$ butterfly operation, and each of first to $(M-1)^{th}$ ones of the butterfly modules is a folded butterfly module described above. When K is an odd number, $M=(K+1)/2$, the first one of the butterfly modules performs a radix-2 butterfly operation, each of second to $M^{th}$ ones of the butterfly modules performs the radix-$2^2$ butterfly operation, and each of the second to $(M-1)^{th}$ ones of the butterfly modules is the folded butterfly module described above.

According to yet another aspect of this invention, there is provided a control method for controlling a folded butterfly module described above. The control method includes the steps of: (A) controlling the second multiplexer to output the input data as the first to-be-stored data, and controlling the buffer to store the first to-be-stored data; (B) controlling the buffer to output the first stored data, controlling the first multiplexer to output the input data as the first selection data, controlling the second multiplexer to output the operation data as the first to-be-stored data, and controlling the buffer to store the first and second to-be-stored data; (C) controlling the buffer to output the first and second stored data, controlling the first multiplexer to output the second stored data as the first selection data, controlling the second multiplexer to output the input data as the first to-be-stored data, controlling the third multiplexer to output the operation data as the second selection data, and controlling the buffer to store the first and second to-be-stored data; and (D) controlling the buffer to output the first and second stored data, controlling the first multiplexer to output the input data as the first selection data, controlling the second multiplexer to output the operation data as the first to-be-stored data, controlling the third multiplexer to output the second stored data as the second selection data, and controlling the buffer to store the first and second to-be-stored data.

BRIEF DESCRIPTION OF THE DRAWINGS

Other features and advantages of this invention will become apparent in the following detailed description of the embodiments of this invention with reference to the accompanying drawings, of which:

FIGS. 10, 11 and 12 are timing diagrams illustrating operations of the first butterfly module;

FIGS. 13, 14 and 15 are timing diagrams illustrating operations of a second butterfly module of the pipelined FFT processor of the first embodiment shown in FIG. 6;

FIGS. 16 and 17 are timing diagrams illustrating operations of a third butterfly module of the pipelined FFT processor of the first embodiment shown in FIG. 6;

FIG. 19 is a timing diagram illustrating operations of the fourth butterfly module;

DETAILED DESCRIPTION OF THE EMBODIMENTS

Figure 1:
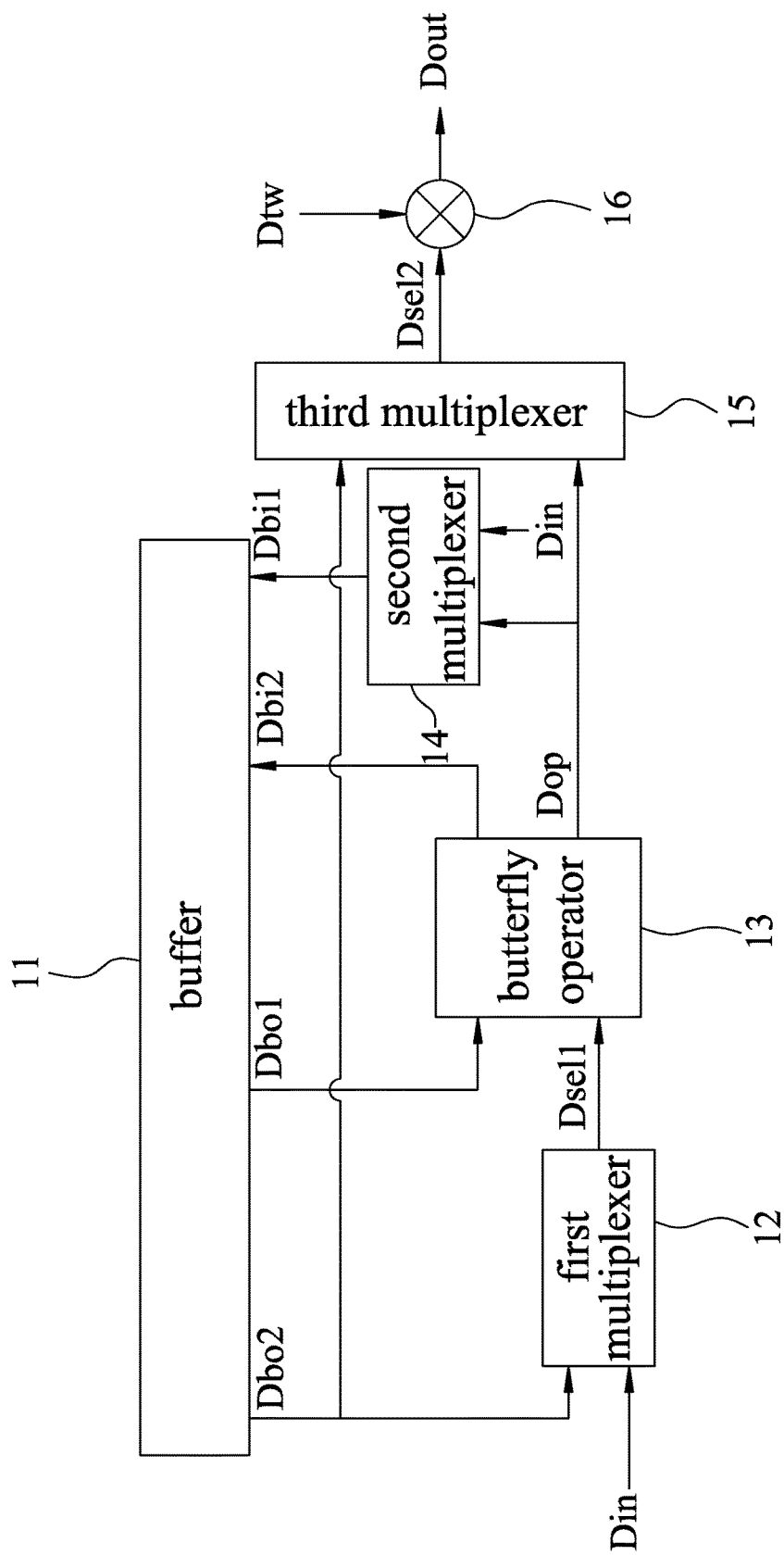
FIG. 1 is a schematic block diagram illustrating an embodiment of a folded butterfly module according to this invention.

Before this invention is described in greater detail with reference to the accompanying embodiments, it should be noted herein that like elements are denoted by the same reference numerals throughout the disclosure.

Referring to FIG. 1, an embodiment of a folded butterfly module according to this invention is adapted to perform a radix-$2^2$ butterfly operation, and includes a buffer 11, a first multiplexer 12, a butterfly operator 13, a second multiplexer 14, a third multiplexer 15 and a multiplier 16.

The buffer 11 receives first to-be-stored data (Dbi1) and second to-be-stored data (Dbi2), and is operable to store the first and second to-be-stored data (Dbi1, Dbi2) and to output first stored data (Dbo1) and second stored data (Dbo2).

The first multiplexer 12 is coupled to the buffer 11 for receiving the second stored data (Dbo2) therefrom, is adapted to receive input data (Din), and is operable to output one of the second stored data (Dbo2) and the input data (Din) as first selection data (Dsel1).

The butterfly operator 13 is coupled to the buffer 11 and the first multiplexer 12 for receiving the first stored data (Dbo1) and the first selection data (Dsel1) respectively therefrom, and performs a radix-2 butterfly operation on the first stored data (Dbo1) and the first selection data (Dsel1) to generate operation data (Dop) and the second to-be-stored data (Dbi2).

The second multiplexer 14 is coupled to the butterfly operator 13 and the buffer 11, is adapted to receive the input data (Din), receives the operation data (Dop) from the butterfly operator 13, and is operable to output one of the input data (Din) and the operation data (Dop) as the first to-be-stored data (Dbi1).

The third multiplexer 15 is coupled to the butterfly operator 13 and the buffer 11 for receiving the operation data (Dop) and the second stored data (Dbo2) respectively therefrom, and is operable to output one of the operation data (Dop) and the second stored data (Dbo2) as second selection data (Dsel2).

The multiplier 16 is coupled to the third multiplexer 15 for receiving the second selection data (Dsel2) therefrom, and generates output data (Dout) that equals a product of the second selection data (Dsel2) and predetermined twiddle data (Dtw).

In this embodiment, each of the input data (Din), the first and second to-be-stored data (Dbi1, Dbi2), the first and second stored data (Dbo1, Dbo2), the first and second selection data (Dsel1, Dsel2), the operation data (Dop), the twiddle data (Dtw) and the output data (Dout) has a number (P) of samples, where $P=2^Q$, Q is an integer larger than or equal to zero, and the samples are parallel when $P \geq 2$ (i.e., $Q \geq 1$).

Figure 2:
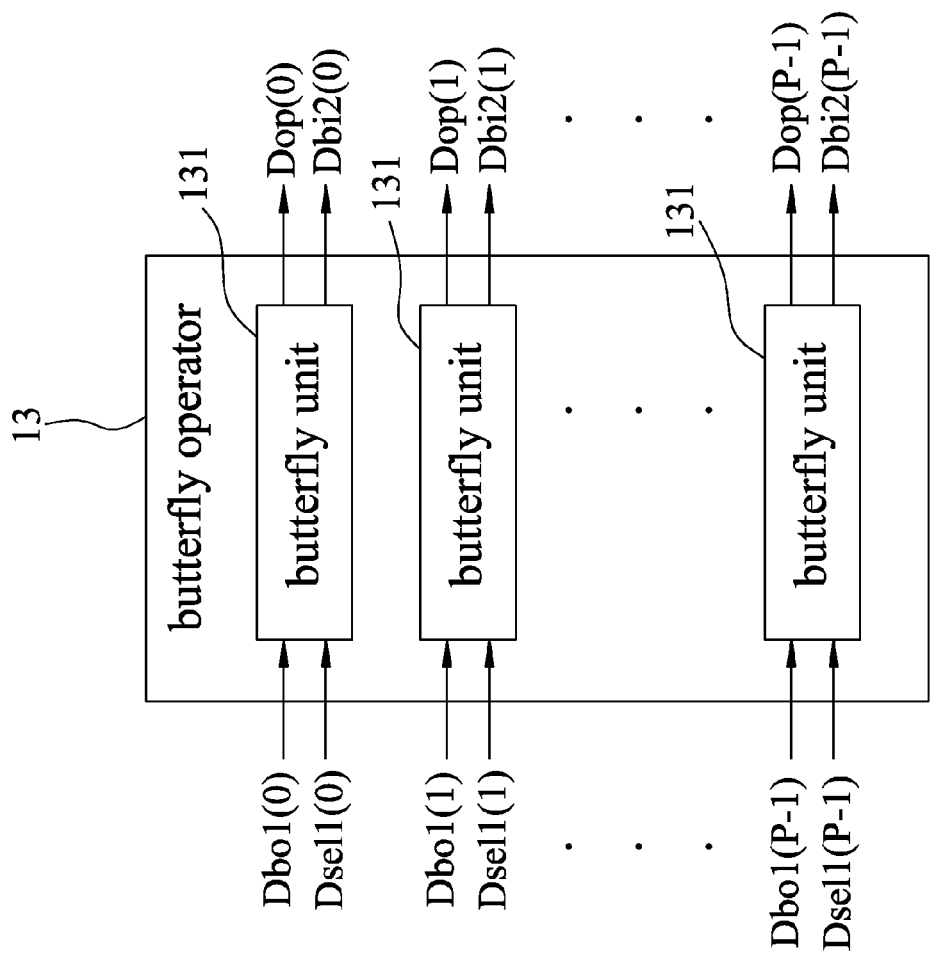
FIG. 2 is a schematic block diagram illustrating a first implementation of a butterfly operator of the embodiment shown in FIG. 1.

In this embodiment, there are two implementations of the butterfly operator 13. A first implementation is shown in FIG. 2. A second implementation is shown in FIGS. 3 and 4.

Referring to FIG. 2, in the first implementation, the butterfly operator 13 includes the number (P) of butterfly units 131. When P=1 (i.e., Q=0), the sample of the first stored data (Dbo1(0)) and the sample of the first selection data (Dsel1(0)) are processed by the butterfly unit 131 to obtain the sample of the operation data (Dop(0)) and the sample of the second to-be-stored data (Dbi2(0)), where Dop(0)=Dbo1(0)+Dsel1(0), and Dbi2(0)={Dbo1(0)−Dsel1(0) or −j[Dbo1(0)−Dsel1(0)]}. When $P \geq 2$ (i.e., $Q \geq 1$), the samples of the first stored data (Dbo1(0) to Dbo1 (P−1)) are paired with the samples of the first selection data (Dsel1(0) to Dsel1(P−1)), respectively, and the samples of each pair (Dbo1(z), Dsel1(z)) are processed by a respective one of the butterfly units 131 to obtain a sample of the operation data (Dop(z)) and a sample of the second to-be-stored data (Dbi2(z)), where z is an integer ranging from 0 to P−1, Dop(z)=Dbo1(z)+Dsel1(z), and Dbi2(z)={Dbo1(z)−Dsel1(z) or −j[Dbo1(z)−Dsel1(z)]}.

Figure 3:
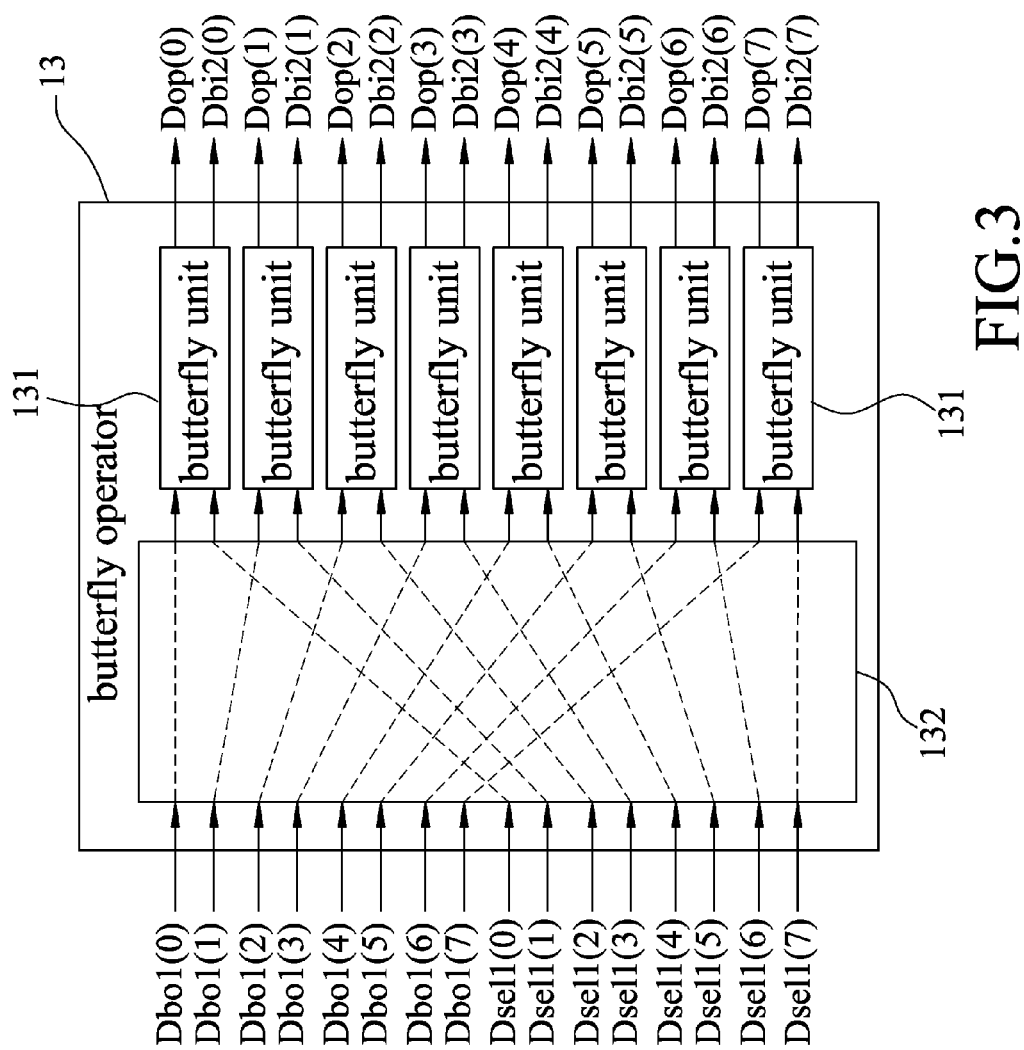
FIGS. 3 and 4 are schematic block diagrams illustrating a second implementation of the butterfly operator of the embodiment shown in FIG. 1.
Figure 4:
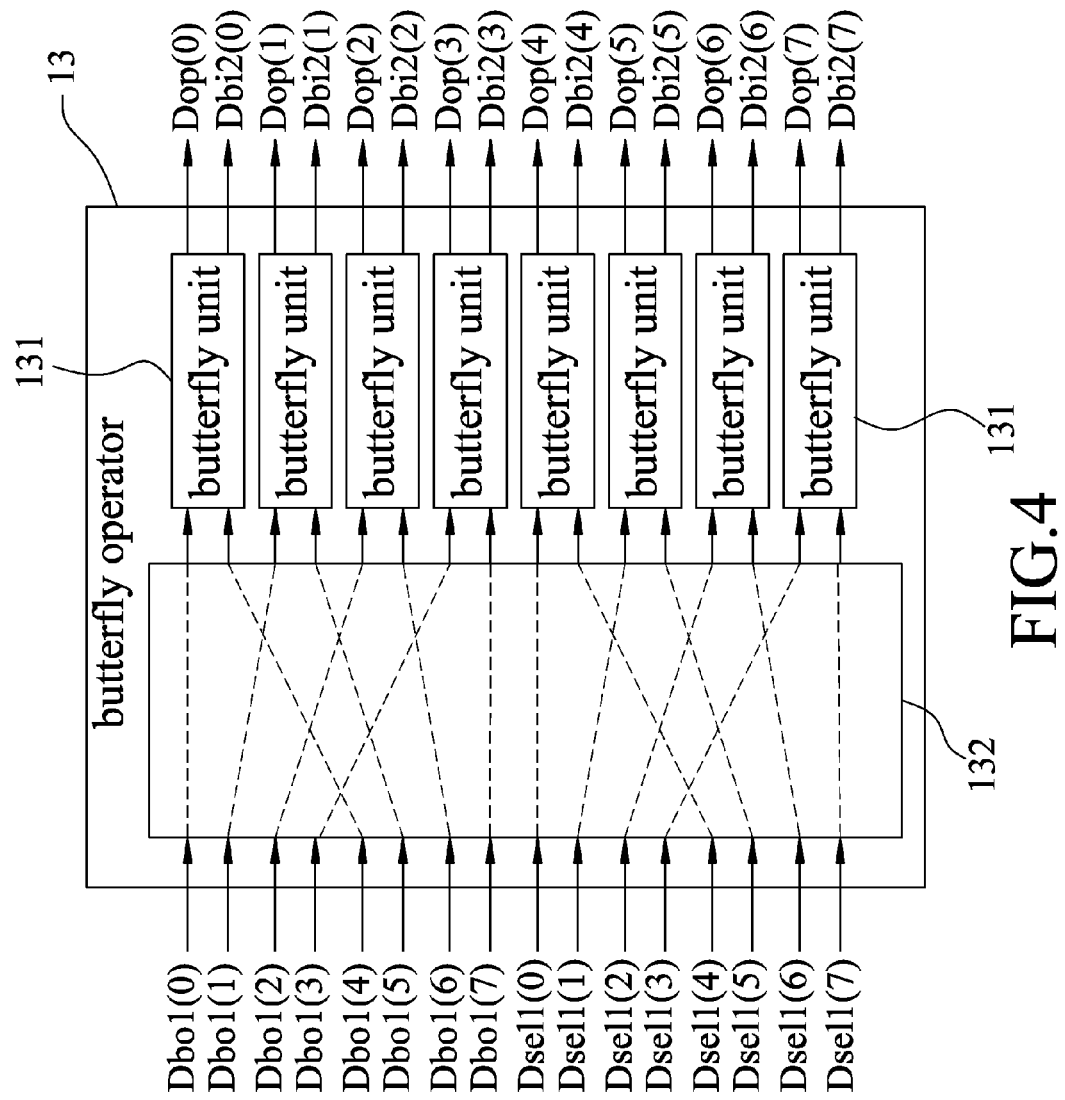

Referring to FIGS. 3 and 4, the second implementation of the butterfly operator 13 differs from the first implementation in that the butterfly operator 13 further includes a commutating unit 132. The second implementation of the butterfly operator 13 is configured suitably for the case where $P \geq 8$ (i.e., $Q \geq 3$). FIGS. 3 and 4 depict a configuration of the butterfly operator 13 when P=8 (i.e., Q=3). The commutating unit 132 is operable to change the pairing of the samples of the first stored data (Dbo1(0) to Dbo1(P−1)) and the samples of the first selection data (Dsel1(0) to Dsel1(P−1)) with one of first and second pairing schemes (respectively shown in FIGS. 3 and 4). When P=8, in the first pairing scheme, the sample of the first stored data (Dbo1(z)) and the sample of the first selection data (Dsel1(z)) are paired, where $0 \leq z \leq 7$. In the second pairing scheme, the samples of the first stored data (Dbo1(z), Dbo1(z+4)) are paired, and the samples of the first selection data (Dsel1(z), Dsel1(z+4)) are paired, where $0 \leq z \leq 3$. Since how the commutating unit 132 changes the pairing of the samples of the first stored data (Dbo1(0) to Dbo1(P−1)) and the samples of the first selection data (Dsel1(0) to Dsel1(P−1)) when $P \geq 16$ (i.e., $Q \geq 4$) can be inferred from the description above, details thereof are omitted for the sake of brevity.

Figure 5:
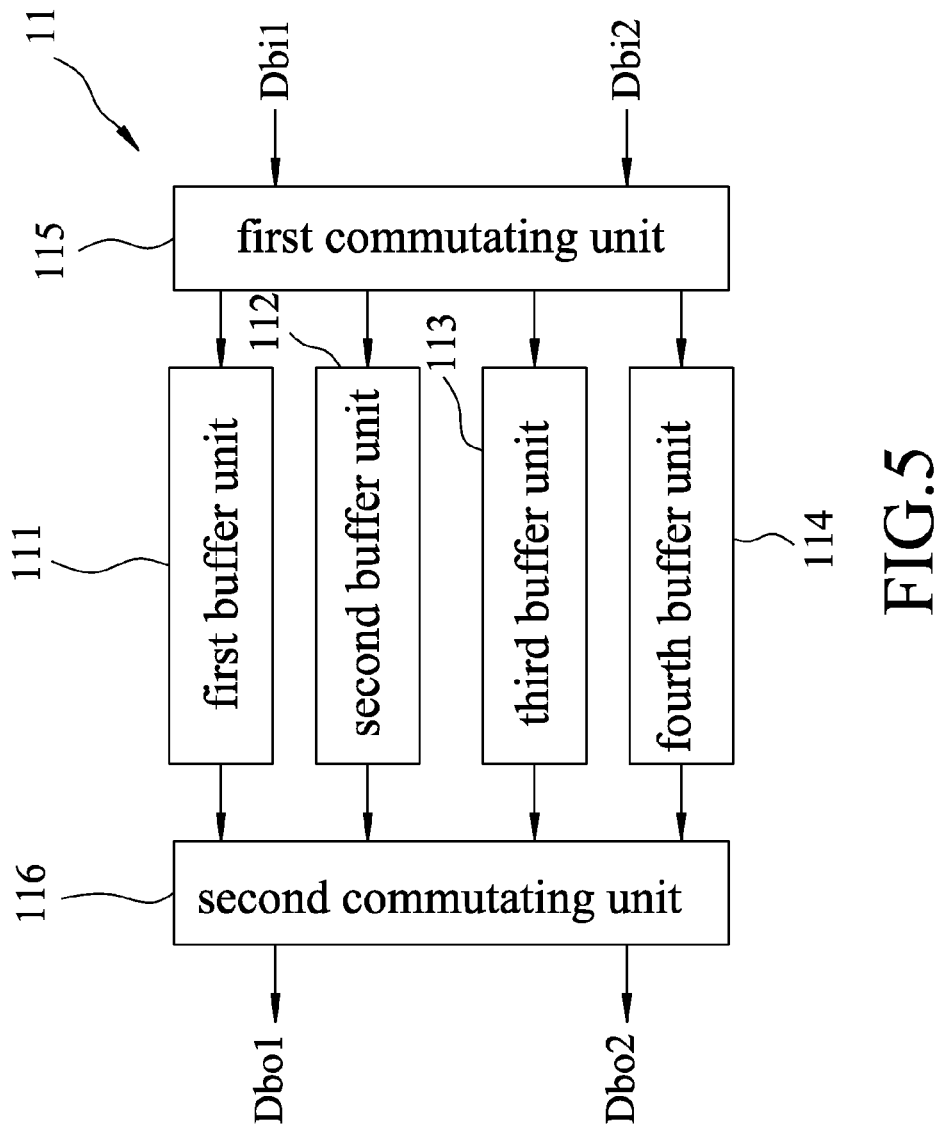
FIG. 5 is a schematic block diagram illustrating a buffer of the embodiment shown in FIG. 1.

Referring to FIG. 5, in this embodiment, the buffer 11 includes a first buffer unit 111, a second buffer unit 112, a third buffer unit 113, a fourth buffer unit 114, a first commutating unit 115 and a second commutating unit 116. Each of the first to fourth buffer units 111-114 is operable to store data received thereby and output data stored thereby. The first commutating unit 115 is coupled to the first to fourth buffer units 111-114, receives the first and second to-be-stored data (Dbi1, Dbi2), and is operable to output the first and second to-be-stored data (Dbi1, Dbi2) respectively to two of the first to fourth buffer units 111-114. The second commutating unit 116 is coupled to the first to fourth buffer units 111-114 for receiving the data outputted thereby, and is operable to output the data received from two of the first to fourth buffer units 111-114 respectively as the first and second stored data (Dbo1, Dbo2).

Figure 6:
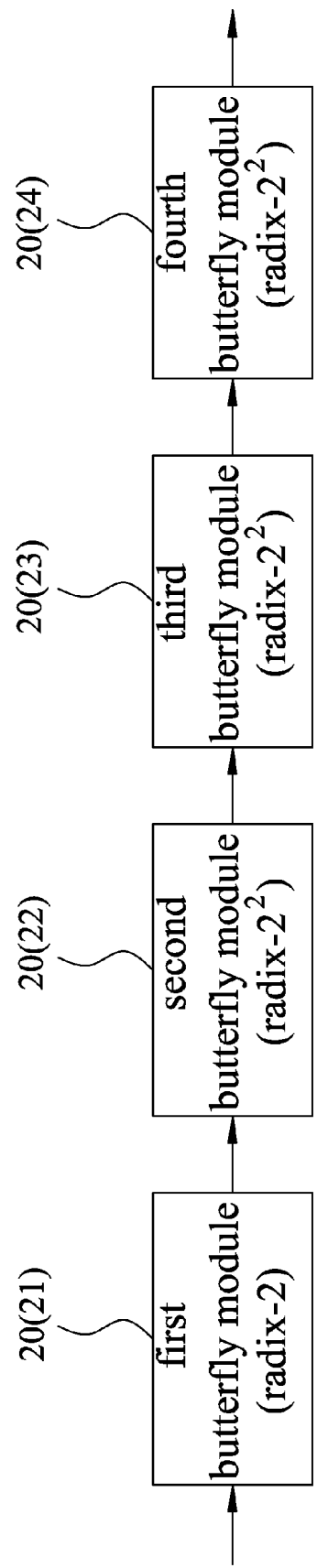
FIG. 6 is a schematic block diagram illustrating a first embodiment of a pipelined fast Fourier transform (FFT) processor according to this invention.
Figure 7:
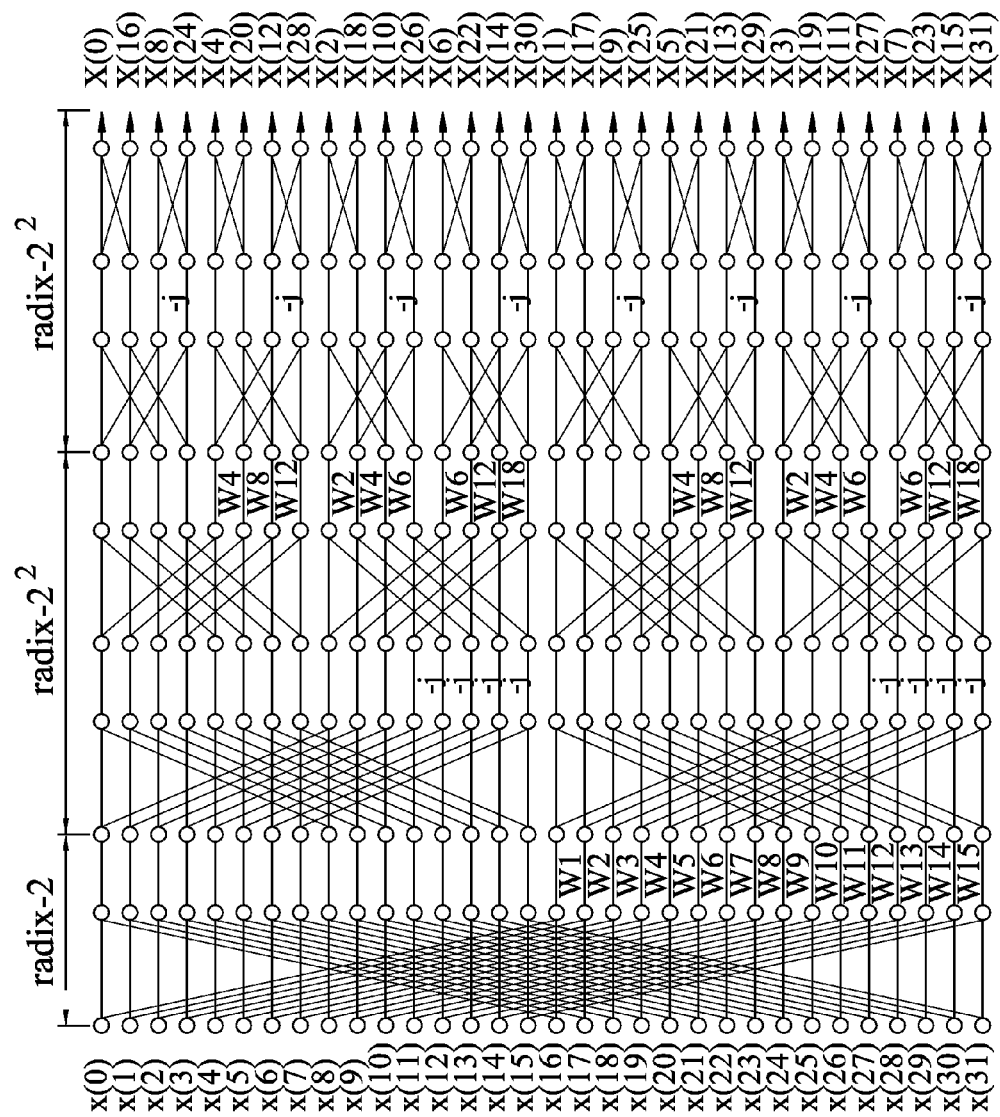
FIG. 7 is a schematic diagram illustrating 32-point FFT computation performed by an example of the first embodiment shown in FIG. 6.

Referring to FIG. 6, a first embodiment of a pipelined fast Fourier transform (FFT) processor according to this invention is adapted to perform an N-point FFT, where $N=2^K$ and K is an odd integer larger than four. The pipelined FFT processor includes a number (M) of cascaded butterfly modules 20, where $M=(K+1)/2$ with a first one of the butterfly modules 20 in the cascade performing a radix-2 butterfly operation and second to $M^{th}$ ones of the butterfly modules 20 in the cascade performing a radix-$2^2$ butterfly operation, where each of the second to $(M-1)^{th}$ ones of the butterfly modules 20 is the folded butterfly module shown in FIG. 1, while the first and $M^{th}$ ones of the butterfly modules 20 are conventional butterfly modules. In the configuration of the pipelined FFT processor shown in FIG. 6, M=4 (i.e., K=7 and N=128), where for the sake of simplicity, the $z^{th}$ one of the butterfly modules 20 is referred to as the $z^{th}$ butterfly module 21-24 hereinafter, where $1 \leq z \leq 4$. FIG. 7 depicts 32-point FFT computation on data samples x(0) to x(31) performed by an example of the pipelined FFT processor when M=3 (i.e., K=5 and N=32). In FIG. 7, the second butterfly module is the folded butterfly module shown in FIG. 1 and performs a radix-$2^2$ butterfly operation. When P=8, a first stage of the second butterfly module uses the first pairing scheme shown in FIG. 3, and a second stage of the same uses the second pairing scheme shown in FIG. 4. In addition, W1 to W18 represent twiddle factors used in the multiplication made by the multiplier 16 (see FIG. 1). Details of this embodiment in an exemplary scheme in which M=4 (i.e., K=7 and N=128) are described below. Details of this embodiment in a scenario in which M equals a number other than four can be inferred from the description below, and are omitted for the sake of brevity.

Figure 8:
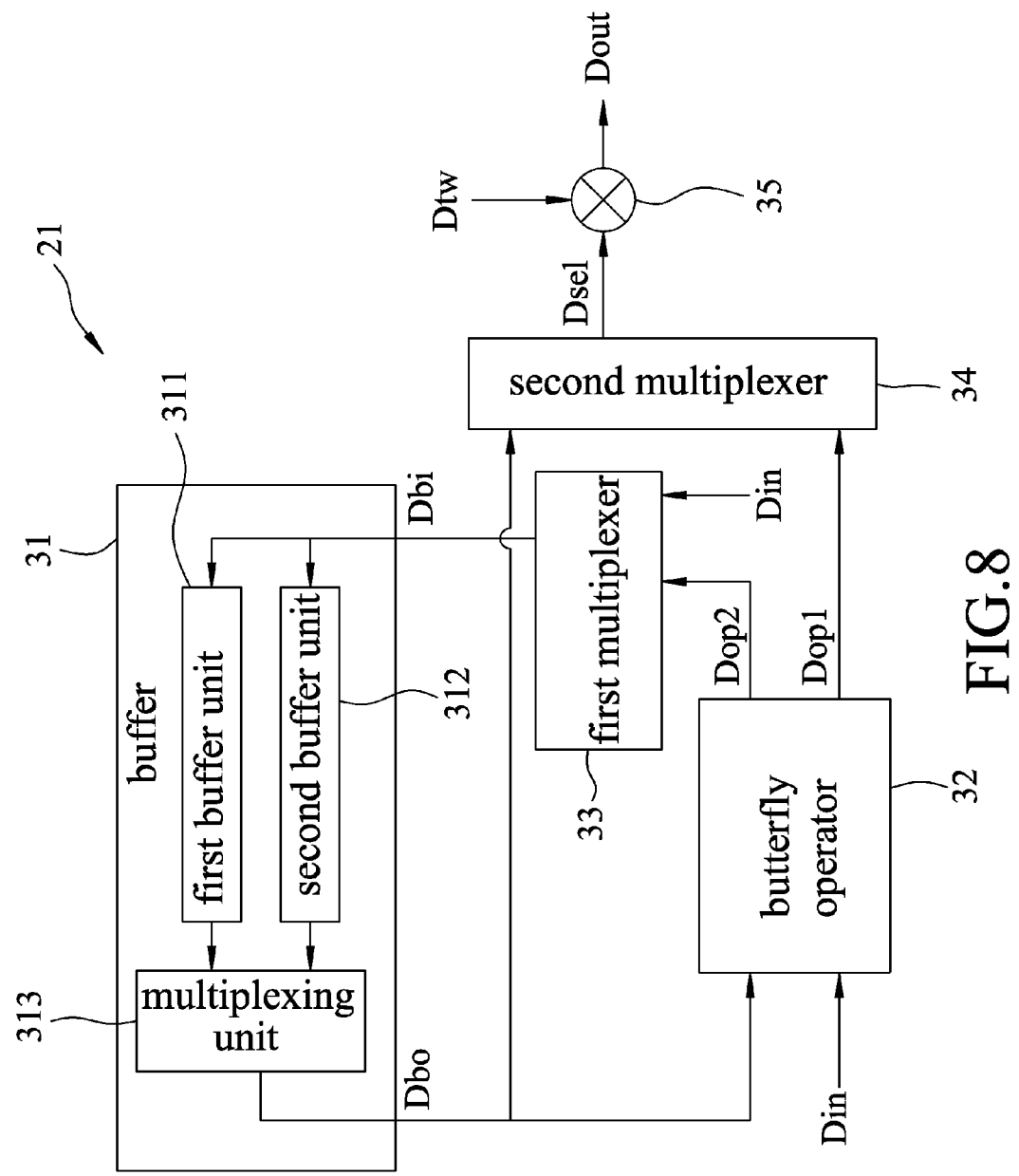
FIG. 8 is a schematic block diagram illustrating a first butterfly module of the pipelined FFT processor of the first embodiment shown in FIG. 6.
Figure 9:
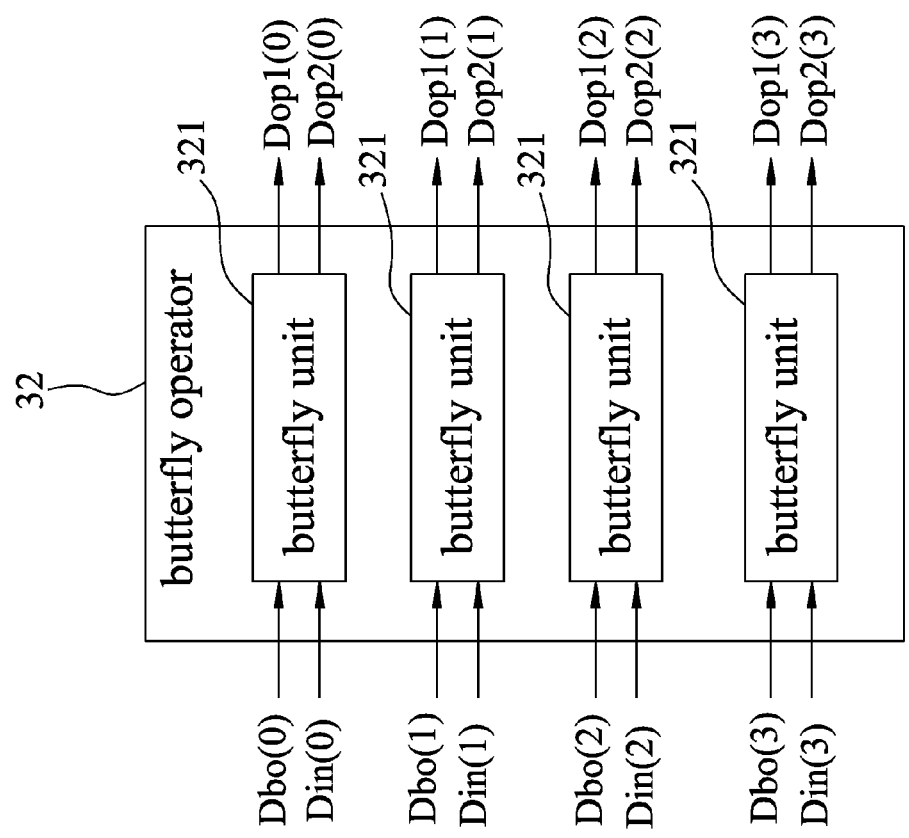
FIG. 9 is a schematic block diagram illustrating a butterfly operator of the first butterfly module.

Referring to FIGS. 8 and 9, the first butterfly module 21 performs the radix-2 butterfly operation, and includes a buffer 31, a butterfly operator 32, a first multiplexer 33, a second multiplexer 34 and a multiplier 35. The buffer 31 receives to-be-stored data (Dbi), and is operable to store the to-be-stored data (Dbi) and to output stored data (Dbo). The butterfly operator 32 is coupled to the buffer 31 for receiving the stored data (Dbo) therefrom, is adapted to receive input data (Din), and performs the radix-2 butterfly operation on the stored data (Dbo) and the input data (Din) to generate first operation data (Dop1) and second operation data (Dop2). The first multiplexer 33 is coupled to the butterfly operator 32 and the buffer 31, is adapted to receive the input data (Din), receives the second operation data (Dop2) from the butterfly operator 32, and is operable to output one of the input data (Din) and the second operation data (Dop2) as the to-be-stored data (Dbi) to the buffer 31. The second multiplexer 34 is coupled to the buffer 31 and the butterfly operator 32 for receiving the stored data (Dbo) and the first operation data (Dop1) respectively therefrom, and is operable to output one of the stored data (Dbo) and the first operation data (Dop1) as selection data (Dsel). The multiplier 35 is coupled to the second multiplexer 34 for receiving the selection data (Dsel) therefrom, and generates output data (Dout) that equals a product of the selection data (Dsel) and predetermined twiddle data (Dtw).

In this embodiment, each of the input data (Din), the to-be-stored data (Dbi), the stored data (Dbo), the first and second operation data (Dop1, Dop2), the selection data (Dsel), the twiddle data (Dtw) and the output data (Dout) of the first butterfly module 21 has four parallel samples.

In this embodiment, the butterfly operator 32 of the first butterfly module 21 includes four butterfly units 321. The samples of the stored data (Dbo(0) to Dbo(3)) are paired with the samples of the input data (Din(0) to Din(3)), respectively. The samples of each pair (Dbo(z), Din(z)) are processed by a respective butterfly unit 321 to obtain a respective sample of the first operation data (Dop1(z)) and a respective sample of the second operation data (Dop2(z)), where $0 \leq z \leq 3$, Dop1(z)=Dbo(z)+Din(z), and Dop2(z)=Dbo(z)−Din(z).

In this embodiment, the buffer 31 of the first butterfly module 21 includes a first buffer unit 311, a second buffer unit 312 and a multiplexing unit 313. Each of the first and second buffer units 311, 312 is a single-port memory, has eight memory spaces (Y0-Y7), receives the to-be-stored data (Dbi), and is operable to store the to-be-stored data (Dbi) and to output data stored thereby. The multiplexing unit 313 is coupled to the first and second buffer units 311, 312 for receiving the data outputted by each of the first and second buffer units 311, 312, and is operable to output the data received from one of the first and second buffer units 311, 312 as the stored data (Dbo).

Referring to FIGS. 8 and 10 to 12, how the first butterfly module 21 is controlled is described below. In FIGS. 10 to 12, "Wz" within the row designating one of the first and second buffer units 311, 312 denotes that the buffer 31 is controlled to store the to-be-stored data (Dbi) into the memory space (Yz) of said one of the first and second buffer units 311, 312, and "Rz" within the row designating one of the first and second buffer units 311, 312 denotes that the buffer 31 is controlled to output the data stored in the memory space (Yz) of said one of the first and second buffer units 311, 312 as the stored data (Dbo), where $0 \leq z \leq 7$.

As shown in FIG. 10, in time periods (T0 to T15), first to sixty-fourth ones of one-hundred-and-twenty-eight original samples (x(0) to x(63)) of a first symbol are sequentially provided as the input data (Din). The first multiplexer 33 is controlled to output the input data (Din) as the to-be-stored data (Dbi), and the buffer 31 is controlled to store the to-be-stored data (Dbi). Accordingly, the first to sixty-fourth ones of the original samples (x(0) to x(63)) of the first symbol are stored in the buffer 31.

As shown in FIG. 11, in time periods (T16 to T31), sixty-fifth to one-hundred-and-twenty-eighth ones of the original samples (x(64) to x(127)) of the first symbol are sequentially provided as the input data (Din). The buffer 31 is controlled to sequentially output the first to sixty-fourth ones of the original samples (x(0) to x(63)) of the first symbol as the stored data (Dbo), the first multiplexer 33 is controlled to output the second operation data (Dop2) as the to-be-stored data (Dbi), the second multiplexer 34 is controlled to output the first operation data (Dop1) as the selection data (Dsel), and the buffer 31 is controlled to store the to-be-stored data (Dbi). Accordingly, based on the original samples (x(0) to x(127)) of the first symbol, the butterfly operator 32 sequentially obtains first to sixty-fourth ones of one-hundred-and-twenty-eight final samples (f(0) to f(63)) associated with the first symbol as the first operation data (Dop1), and sequentially obtains sixty-fifth to one-hundred-and-twenty-eighth ones of the final samples (f(64) to f(127)) associated with the first symbol as the second operation data (Dop2). Based on the first to sixty-fourth ones of the final samples (f(0) to f(63)) associated with the first symbol, the multiplier 35 sequentially obtains first to sixty-fourth ones of one-hundred-and-twenty-eight output samples (a(0) to a(63)) associated with the first symbol as the output data (Dout). The sixty-fifth to one-hundred-and-twenty-eighth ones of the final samples (f(64) to f(127)) associated with the first symbol are stored in the buffer 31. Here, f(z)=x(z)+x(z+64), f(z+64)=x(z)−x(z+64), and a(z)=f(z), where 0≤z≤63.

As shown in FIG. 12, in time periods (T32 to T47), first to sixty-fourth ones of one-hundred-and-twenty-eight original samples (x(0) to x(63)) of a second symbol are sequentially provided as the input data (Din). The buffer 31 is controlled to sequentially output the sixty-fifth to one-hundred-and-twenty-eighth ones of the final samples (f(64) to f(127)) associated with the first symbol as the stored data (Dbo), the first multiplexer 33 is controlled to output the input data (Din) as the to-be-stored data (Dbi), the second multiplexer 34 is controlled to output the stored data (Dbo) as the selection data (Dsel), and the buffer 31 is controlled to store the to-be-stored data (Dbi). Accordingly, based on the sixty-fifth to one-hundred-and-twenty-eighth ones of the final samples (f(64) to f(127)) associated with the first symbol, the multiplier 35 sequentially obtains sixty-fifth to one-hundred-and-twenty-eighth ones of the output samples (a(64) to a(127)) associated with the first symbol as the output data (Dout). The first to sixty-fourth ones of the original samples (x(0) to x(63)) of the second symbol are stored in the buffer 31. Here, a(z+64)=f(z+64)×$W^z$, where 0≤z≤63 and $W^z = e^{-j(2\pi z/128)}$.

The output samples (a(0) to a(127)) associated with the first symbol and generated by the first butterfly module 21 are obtained by performing the radix-2 butterfly operation on the original samples (x(0) to x(127)) of the first symbol, and are referred to as first stage processed samples of the first symbol hereinafter. Since how the first butterfly module 21 is controlled to generate the first stage processed samples (a(0) to a(127)) of the $z^{th}$ symbol can be inferred from the description above, details thereof are omitted for the sake of brevity, where z≥2.

It is noted that, in this embodiment, the buffer 31 of the first butterfly module 21 is controlled to perform the following simultaneously starting from the time period (T15): (a) storing the to-be-stored data (Dbi) into one of the first and second buffer units 311, 312; and (b) outputting the stored data (Dbo) from the other one of the first and second buffer units 311, 312. Each of the first and second buffer units 311, 312 may be the single-port memory, thereby reducing the size of the buffer 31. However, in other embodiments, the buffer 31 may be a multi-port memory.

Each of the second and third butterfly modules 22, 23 shown in FIG. 6 performs the radix-$2^2$ butterfly operation, and is the folded butterfly module shown in FIGS. 1, 2 and 5, where P=4. Referring to FIGS. 5 and 6, in this embodiment, for the buffer 11 of the second butterfly module 22, each of the first to fourth buffer units 111-114 is a single-port memory, and has four memory spaces (Y0-Y3); and for the buffer 11 of the third butterfly module 23, each of the first and fourth buffer units 111, 114 is a single-port memory, and has a memory space (Y0), and each of the second and third buffer units 112, 113 is a single-port register file.

Referring to FIGS. 1 and 13 to 15, how the second butterfly module 22 (see FIG. 6) is controlled is described below. In FIGS. 13 to 15, "Wz" within the row designating one of the first to fourth buffer units 111-114 denotes that the buffer 11 is controlled to store one of the first and second to-be-stored data (Dbi1, Dbi2) into the memory space (Yz) of said one of the first to fourth buffer units 111-114, and "Rz" within the row designating one of the first to fourth buffer units 111-114 denotes that the buffer 11 is controlled to output the data stored in the memory space (Yz) of said one of the first to fourth buffer units 111-114 as one of the first and second stored data (Dbo1, Dbo2), where 0≤z≤3. In addition, the first stage processed samples (a(0) to a(127)) of the first symbol are divided into a first group including the samples (a(0) to a(63)) and a second group including the samples (a(64) to a(127)), the first stage processed samples (a(0) to a(127)) of the second symbol are divided into a third group including the samples (a(0) to a(63)) and a fourth group including the samples (a(64) to a(127)), and so on.

As shown in FIG. 13, in the time periods (T16 to T23), first to thirty-second ones of the sixty-four samples (a(0) to a(31)) of the first group are sequentially provided as the input data (Din). The second multiplexer 14 is controlled to output the input data (Din) as the first to-be-stored data (Dbi1), and the buffer 11 is controlled to store the first to-be-stored data (Dbi1). Accordingly, the first to thirty-second ones of the samples (a(0) to a(31)) of the first group are stored in the buffer 11.

As shown in FIG. 13, in the time periods (T24 to T31), thirty-third to sixty-fourth ones of the samples (a(32) to a(63)) of the first group are sequentially provided as the input data (Din). The buffer 11 is controlled to sequentially output the first to thirty-second ones of the samples (a(0) to a(31)) of the first group as the first stored data (Dbo1), the first multiplexer 12 is controlled to output the input data (Din) as the first selection data (Dsel1), the second multiplexer 14 is controlled to output the operation data (Dop) as the first to-be-stored data (Dbi1), and the buffer 11 is controlled to store the first and second to-be-stored data (Dbi1, Dbi2). Accordingly, based on the samples (a(0) to a(63)) of the first group, the butterfly operator 13 sequentially obtains first to thirty-second ones of sixty-four intermediate samples (i(0) to i(31)) associated with the first group as the operation data (Dop), and sequentially obtains thirty-third to sixty-fourth ones of the intermediate samples (i(32) to i(63)) associated with the first group as the second to-be-stored data (Dbi2). The intermediate samples (i(0) to i(63)) associated with the first group are stored in the buffer 11. Here, i(z1)=a(z1)+a(z1+32), i(z2+32)=a(z2)−a(z2+32), and i(z3+32)=−j[a(z3)−a(z3+32)], where 0≤z1≤31, 0≤z2≤15 and 16≤z3≤31.

As shown in FIG. 14, in the time periods (T32 to T39), first to thirty-second ones of the sixty-four samples (a(64) to a(95)) of the second group are sequentially provided as the input data (Din). The buffer 11 is controlled to sequentially output the first to sixteenth ones and thirty-third to forty-eighth ones of the intermediate samples (i(0) to i(15), i(32) to i(47)) associated with the first group as the first stored data (Dbo1), and to sequentially output the seventeenth to thirty-second ones and the forty-ninth to sixty-fourth ones of the intermediate samples (i(16) to i(31), i(48) to i(63)) associated with the first group as the second stored data (Dbo2). In the time periods (T32 to T39), the first multiplexer 12 is controlled to output the second stored data (Dbo2) as the first selection data (Dsel1), the second multiplexer 14 is controlled to output the input data (Din) as the first to-be-stored data (Dbi1), the third multiplexer 15 is controlled to output the operation data (Dop) as the second selection data (Dsel2), and the buffer 11 is controlled to store the first and second to-be-stored data (Dbi1, Dbi2). Accordingly, based on the intermediate samples (i(0) to i(63)) associated with the first group, the butterfly operator 13 sequentially obtains first to sixteenth ones and thirty-third to forty-eighth ones of sixty-four final samples (f(0) to f(15), f(32) to f(47)) associated with the first group as the operation data (Dop), and sequentially obtains seventeenth to thirty-second ones and forty-ninth to sixty-fourth ones of the final samples (f(16) to f(31), f(48) to f(63)) associated with the first group as the second to-be-stored data (Dbi2). Based on the first to sixteenth ones and the thirty-third to forty-eighth ones of the final samples (f(0) to f(15), f(32) to f(47)) associated with the first group, the multiplier 16 sequentially obtains first to sixteenth ones and thirty-third to forty-eighth ones of sixty-four output samples (b(0) to b(15), b(32) to b(47)) associated with the first group as the output data (Dout). Also, the first to thirty-second ones of the samples (a(64) to a(95)) of the second group and the seventeenth to thirty-second ones and the forty-ninth to sixty-fourth ones of the final samples (f(16) to f(31), f(48) to f(63)) associated with the first group are stored in the buffer 11. Here, f(z1)=i(z1)+i(z1+16), f(z1+16)=i(z1)−i(z1+16), f(z1+32)=i(z1+32)+i(z1+48), f(z1+48)=i(z1+32)−i(z1+48), b(z1)=f(z1), and b(z1+32)=f(z1+32)×$W^{2z1}$, where 0≤z1≤15.

As shown in FIG. 14, in the time periods (T40 to T47), thirty-third to sixty-fourth ones of the samples (a(96) to a(127)) of the second group are sequentially provided as the input data (Din). The buffer 11 is controlled to sequentially output the first to thirty-second ones of the samples (a(64) to a(95)) of the second group as the first stored data (Dbo1), and to sequentially output the seventeenth to thirty-second ones and the forty-ninth to sixty-fourth ones of the final samples (f(16) to f(31), f(48) to f(63)) associated with the first group as the second stored data (Dbo2). The first multiplexer 12 is controlled to output the input data (Din) as the first selection data (Dsel1), the second multiplexer 14 is controlled to output the operation data (Dop) as the first to-be-stored data (Dbi1), the third multiplexer 15 is controlled to output the second stored data (Dbo2) as the second selection data (Dsel2), and the buffer 11 is controlled to store the first and second to-be-stored data (Dbi1, Dbi2). Accordingly, based on the samples (a(64) to a(127)) of the second group, the butterfly operator 13 sequentially obtains first to thirty-second ones of sixty-four intermediate samples (i(64) to i(95)) associated with the second group as the operation data (Dop), and sequentially obtains thirty-third to sixty-fourth ones of the intermediate samples (i(96) to i(127)) associated with the second group as the second to-be-stored data (Dbi2). Based on the seventeenth to thirty-second ones and the forty-ninth to sixty-fourth ones of the final samples (f(16) to f(31), f(48) to f(63)) associated with the first group, the multiplier 16 sequentially obtains seventeenth to thirty-second ones and forty-ninth to sixty-fourth ones of the output samples (b(16) to b(31), b(48) to b(63)) associated with the first group as the output data (Dout). The intermediate samples (i(64) to i(127)) associated with the second group are stored in the buffer 11. Here, i(z1+64)=a(z1+64)+a(z1+96), i(z2+96)=a(z2+64)−a(z2+96), i(z3+96)=−j[a(z3+64)−a(z3+96)], b(z2+16)=f(z2+16)×$W^{4z2}$, and b(z2+48)=f(z2+48)×$W^{6z2}$, where 0≤z1≤31, 0≤z2≤15 and 16≤z3≤31.

As shown in FIG. 15, in time periods (T48 to T55), first to thirty-second ones of the sixty-four samples (a(0) to a(31)) of the third group are sequentially provided as the input data (Din). The buffer 11 is controlled to sequentially output the first to sixteenth ones and the thirty-third to forty-eighth ones of the intermediate samples (i(64) to i(79), i(96) to i(111)) associated with the second group as the first stored data (Dbo1), and to sequentially output the seventeenth to thirty-second ones and the forty-ninth to sixty-fourth ones of the intermediate samples (i(80) to i(95), i(112) to i(127)) associated with the second group as the second stored data (Dbo2). The first multiplexer 12 is controlled to output the second stored data (Dbo2) as the first selection data (Dsel1), the second multiplexer 14 is controlled to output the input data (Din) as the first to-be-stored data (Dbi1), the third multiplexer 15 is controlled to output the operation data (Dop) as the second selection data (Dsel2), and the buffer 11 is controlled to store the first and second to-be-stored data (Dbi1, Dbi2). Accordingly, based on the intermediate samples (i(64) to i(127)) associated with the second group, the butterfly operator 13 sequentially obtains first to sixteenth ones and thirty-third to forty-eighth ones of sixty-four final samples (f(64) to f(79), f(96) to f(111)) associated with the second group as the operation data (Dop), and sequentially obtains seventeenth to thirty-second ones and forty-ninth to sixty-fourth ones of the final samples (f(80) to f(95), f(112) to f(127)) associated with the second group as the second to-be-stored data (Dbi2). Based on the first to sixteenth ones and the thirty-third to forty-eighth ones of the final samples (f(64) to f(79), f(96) to f(111)) associated with the second group, the multiplier 16 sequentially obtains first to sixteenth ones and thirty-third to forty-eighth ones of sixty-four output samples (b(64) to b(79), b(96) to b(111)) associated with the second group as the output data (bout). The first to thirty-second ones of the samples (a(0) to a(31)) of the third group and the seventeenth to thirty-second ones and the forty-ninth to sixty-fourth ones of the final samples (f(80) to f(95), f(112) to f(127)) associated with the second group are stored in the buffer 11. Here, f(z1+64)=i(z1+64)+i(z1+80), f(z1+80)=i(z1+64)−i(z1+80), f(z1+96)=i(z1+96)+i(z1+112), f(z1+112)=i(z1+96)−i(z1+112), b(z1+64)=f(z1+64), and b(z1+96)=f(z1+96)×$W^{2z1}$, where 0≤z1≤15.

As shown in FIG. 15, in time periods (T56 to T63), thirty-third to sixty-fourth ones of the samples (a(32) to a(63)) of the third group are sequentially provided as the input data (Din). The buffer 11 is controlled to sequentially output the first to thirty-second ones of the samples (a(0) to a(31)) of the third group as the first stored data (Dbo1), and to sequentially output the seventeenth to thirty-second ones and the forty-ninth to sixty-fourth ones of the final samples (f(80) to f(95), f(112) to f(127)) associated with the second group as the second stored data (Dbo2). The first multiplexer 12 is controlled to output the input data (Din) as the first selection data (Dsel1), the second multiplexer 14 is controlled to output the operation data (Dop) as the first to-be-stored data (Dbi1), the third multiplexer 15 is controlled to output the second stored data (Dbo2) as the second selection data (Dsel2), and the buffer 11 is controlled to store the first and second to-be-stored data (Dbi1, Dbi2). Accordingly, based on the samples (a(0) to a(63)) of the third group, the butterfly operator 13 sequentially obtains first to thirty-second ones of sixty-four intermediate samples (i(0) to i(31)) associated with the third group as the operation data (Dop), and sequentially obtains thirty-third to sixty-fourth ones of the intermediate samples (i(32) to i(63)) associated with the third group as the second to-be-stored data (Dbi2). Based on the seventeenth to thirty-second ones and the forty-ninth to sixty-fourth ones of the final samples (f(80) to f(95), f(112) to f(127)) associated with the second group, the multiplier 16 sequentially obtains seventeenth to thirty-second ones and forty-ninth to sixty-fourth ones of the output samples (b(80) to b(95), b(112) to b(127)) associated with the second group as the output data (Dout). The intermediate samples (i(0) to i(63)) associated with the third group are stored in the buffer 11. Here, i(z1)=a(z1)+a(z1+32), i(z2+32)=a(z2)−a(z2+32), i(z3+32)=−j[a(z3)−a(z3+32)], b(z2+80)=f(z2+80)×$W^{4z2}$, and b(z2+112)=f(z2+112)×$W^{6z2}$, where 0≤z1≤31, 0≤z2≤15 and 16≤z3≤31.

The output samples (b(0) to b(127)) associated with the first and second groups and generated by the second butterfly module 22 (see FIG. 6) are obtained by performing the radix-$2^2$ butterfly operation on the first stage processed samples (a(0) to a(127)) of the first symbol, and are referred to as second stage processed samples of the first symbol hereinafter. Since how the second butterfly module 22 (see FIG. 6) is controlled to generate the second stage processed samples (b(0) to b(127)) of the $z^{th}$ symbol can be inferred from the description above, details thereof are omitted for the sake of brevity, where z≥2.

It is noted that, in this embodiment, the buffer 11 of the second butterfly module 22 (see FIG. 6) is controlled to perform the following simultaneously starting from the time period (T31): (a) storing the first and second to-be-stored data (Dbi1, Dbi2) respectively into two of the first to fourth buffer units 111-114; and (b) outputting the first and second stored data (Dbo1, Dbo2) respectively from the other two of the first to fourth buffer units 111-114. Each of the first to fourth buffer units 111-114 may be the single-port memory, thereby reducing the size of the buffer 11. However, in other embodiments, the buffer 11 may be a multi-port memory.

Figure 17:
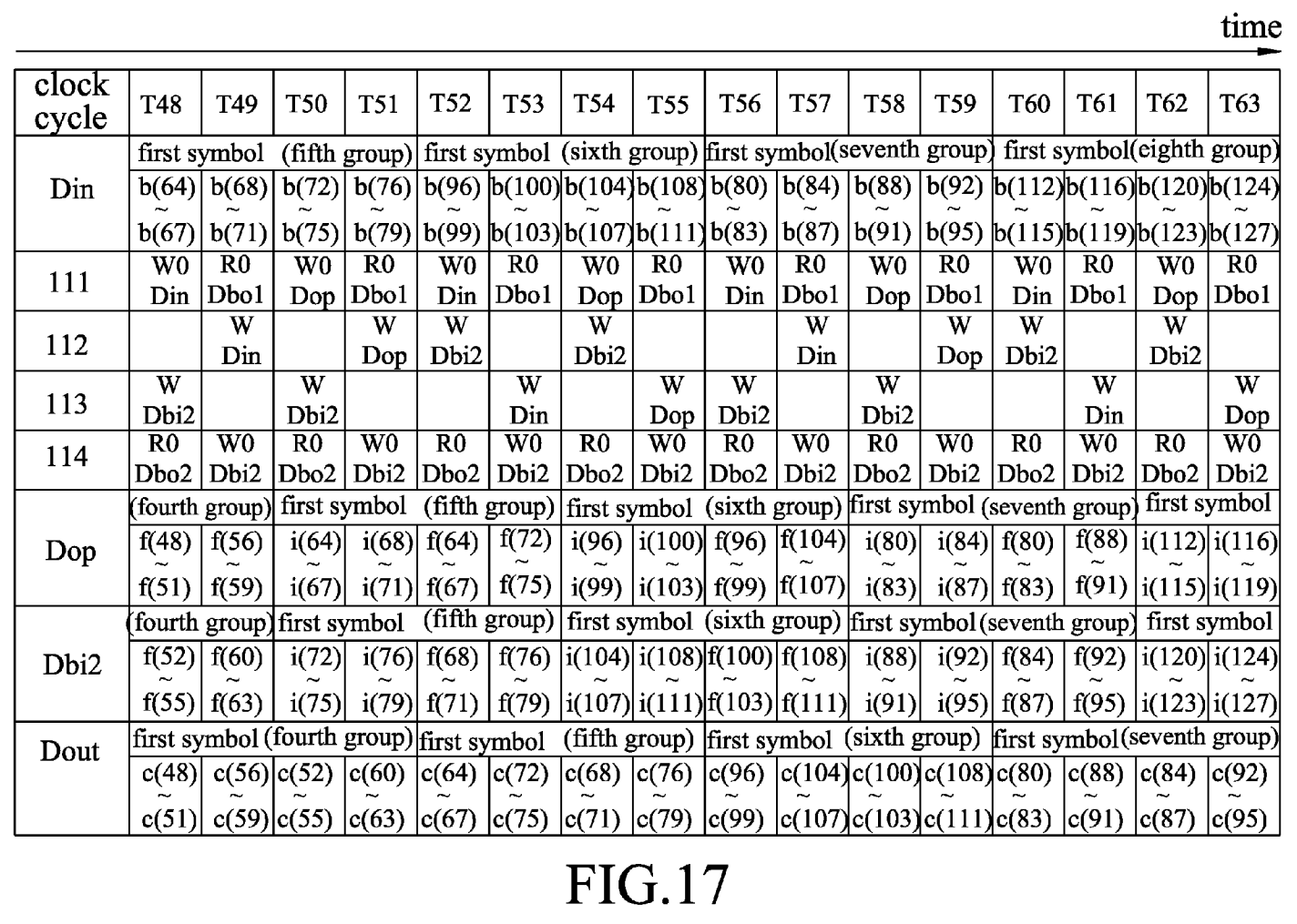

Referring to FIGS. 1, 16 and 17, how the third butterfly module 23 (see FIG. 6) is controlled is described below. In FIGS. 16 and 17, "W0" within the row designating one of the first and fourth buffer units 111, 114 denotes that the buffer 11 is controlled to store one of the first and second to-be-stored data (Dbi1, Dbi2) into the memory space (Y0) of said one of the first and fourth buffer units 111, 114, "R0" within the row designating one of the first and fourth buffer units 111, 114 denotes that the buffer 11 is controlled to output the data stored in the memory space (Y0) of said one of the first and fourth buffer units 111, 114 as one of the first and second stored data (Dbo1, Dbo2), and "W" within the row designating one of the second and third buffer units 112, 113 denotes that the buffer 11 is controlled to store one of the first and second to-be-stored data (Dbi1, Dbi2) into said one of the second and third buffer units 112, 113. In addition, the second stage processed samples (b(0) to b(127)) of the first symbol are divided into a first group including the samples (b(0) to b(15)), a second group including the samples (b(32) to b(47)), a third group including the samples (b(16) to b(31)), a fourth group including the samples (b(48) to b(63)), a fifth group including the samples (b(64) to b(79)), a sixth group including the samples (b(96) to b(111)), a seventh group including the samples (b(80) to b(95)), and an eighth group including the samples (b(112) to b(127)). The second stage processed samples (b(0) to b(127)) of the second symbol are divided into a ninth group including the samples (b(0) to b(15)), a tenth group including the samples (b(32) to b(47)), an eleventh group including the samples (b(16) to b(31)), a twelfth group including the samples (b(48) to b(63)), a thirteenth group including the samples (b(64) to b(79)), a fourteenth group including the samples (b(96) to b(111)), a fifteenth group including the samples (b(80) to b(95)), and a sixteenth group including the samples (b(112) to b(127)).

As shown in FIG. 16, in the time periods (T32, T33), first to eighth ones of the sixteen samples (b(0) to b(7)) of the first group are sequentially provided as the input data (Din). The second multiplexer 14 is controlled to output the input data (Din) as the first to-be-stored data (Dbi1), and the buffer 11 is controlled to store the first to-be-stored data (Dbi1). Accordingly, the first to eighth ones of the samples (b(0) to b(7)) of the first group are stored in the buffer 11.

As shown in FIG. 16, in the time periods (T34, T35), ninth to sixteenth ones of the samples (b(8) to b(15)) of the first group are sequentially provided as the input data (Din). The buffer 11 is controlled to sequentially output the first to eighth ones of the samples (b(0) to b(7)) of the first group as the first stored data (Dbo1), the first multiplexer 12 is controlled to output the input data (Din) as the first selection data (Dsel1), the second multiplexer 14 is controlled to output the operation data (Dop) as the first to-be-stored data (Dbi1), and the buffer 11 is controlled to store the first and second to-be-stored data (Dbi1, Dbi2). Accordingly, based on the samples (b(0) to b(15)) of the first group, the butterfly operator 13 sequentially obtains first to eighth ones of sixteen intermediate samples (i(0) to i(7)) associated with the first group as the operation data (Dop), and sequentially obtains ninth to sixteenth ones of the intermediate samples (i(8) to i(15)) associated with the first group as the second to-be-stored data (Dbi2). The intermediate samples (i(0) to i(15)) associated with the first group are stored in the buffer 11. Here, i(z1)=b(z1)+b(z1+8), i(z2+8)=b(z2)−b(z2+8), and i(z3+8)=−j[b(z3)−b(z3+8)], where 0≤z1≤7, 0≤z2≤3 and 4≤z3≤7.

As shown in FIG. 16, in the time periods (T36, T37), first to eighth ones of the sixteen samples (b(32) to b(39)) of the second group are sequentially provided as the input data (Din). The buffer 11 is controlled to sequentially output the first to fourth ones and the ninth to twelfth ones of the intermediate samples (i(0) to i(3), i(8) to i(11)) associated with the first group as the first stored data (Dbo1), and to sequentially output the fifth to eighth ones and the thirteenth to sixteenth ones of the intermediate samples (i(4) to i(7), i(12) to i(15)) associated with the first group as the second stored data (Dbo2). The first multiplexer 12 is controlled to output the second stored data (Dbo2) as the first selection data (Dsel1), the second multiplexer 14 is controlled to output the input data (Din) as the first to-be-stored data (Dbi1), the third multiplexer 15 is controlled to output the operation data (Dop) as the second selection data (Dsel2), and the buffer 11 is controlled to store the first and second to-be-stored data (Dbi1, Dbi2). Accordingly, based on the intermediate samples (i(0) to i(15)) associated with the first group, the butterfly operator 13 sequentially obtains first to fourth ones and ninth to twelfth ones of sixteen final samples (f(0) to f(3), f(8) to f(11)) associated with the first group as the operation data (Dop), and sequentially obtains fifth to eighth ones and thirteenth to sixteenth ones of the final samples (f(4) to f(7), f(12) to f(15)) associated with the first group as the second to-be-stored data (Dbi2). Based on the first to fourth ones and the ninth to twelfth ones of the final samples (f(0) to f(3), f(8) to f(11)) associated with the first group, the multiplier 16 sequentially obtains first to fourth ones and ninth to twelfth ones of sixteen output samples (c(0) to c(3), c(8) to c(11)) associated with the first group as the output data (Dout). The first to eighth ones of the samples (b(32) to b(39)) of the second group and the fifth to eighth ones and the thirteenth to sixteenth ones of the final samples (f(4) to f(7), f(12) to f(15)) associated with the first group are stored in the buffer 11. Here, f(z1)=i(z1)+i(z1+4), f(z1+4)=i(z1)−i(z1+4), f(z1+8)=i(z1+8)+i(z1+12), f(z1+12)=i(z1+8)−i(z1+12), c(z1)=f(z1), and c(z1+8)=f(z1+8)×$W^{8z1}$, where 0≤z1≤3.

As shown in FIG. 16, in the time periods (T38, T39), ninth to sixteenth ones of the samples (b(40) to b(47)) of the second group are sequentially provided as the input data (Din). The buffer 11 is controlled to sequentially output the first to eighth ones of the samples (b(32) to b(39)) of the second group as the first stored data (Dbo1), and to sequentially output the fifth to eighth ones and the thirteenth to sixteenth ones of the final samples (f(4) to f(7), f(12) to f(15)) associated with the first group as the second stored data (Dbo2). The first multiplexer 12 is controlled to output the input data (Din) as the first selection data (Dsel1), the second multiplexer 14 is controlled to output the operation data (Dop) as the first to-be-stored data (Dbi1), the third multiplexer 15 is controlled to output the second stored data (Dbo2) as the second selection data (Dsel2), and the buffer 11 is controlled to store the first and second to-be-stored data (Dbi1, Dbi2). Accordingly, based on the samples (b(32) to b(47)) of the second group, the butterfly operator 13 sequentially obtains first to eighth ones of sixteen intermediate samples (i(32) to i(39)) associated with the second group as the operation data (Dop), and sequentially obtains ninth to sixteenth ones of the intermediate samples (i(40) to i(47)) associated with the second group as the second to-be-stored data (Dbi2). Based on the fifth to eighth ones and the thirteenth to sixteenth ones of the final samples (f(4) to f(7), f(12) to f(15)) associated with the first group, the multiplier 16 sequentially obtains fifth to eighth ones and thirteenth to sixteenth ones of the output samples (c(4) to c(7), c(12) to c(15)) associated with the first group as the output data (Dout). The intermediate samples (i(32) to i(47)) associated with the second group are stored in the buffer 11. Here, $i(z1+32)=b(z1+32)+b(z1+40)$, $i(z2+40)=b(z2+32)-b(z2+40)$, $i(z3+40)=-j[b(z3+32)-b(z3+40)]$, $c(z2+4)=f(z2+4)\lambda W^{16z2}$, and $c(z2+12)=f(z2+12)\times W^{24z2}$, where $0 \leq z1 \leq 7$, $0 \leq z2 \leq 3$ and $4 \leq z3 \leq 7$.

As shown in FIG. 16, in the time periods (T40, T41), first to eighth ones of the sixteen samples (b(16) to b(23)) of the third group are sequentially provided as the input data (Din). The buffer 11 is controlled to sequentially output the first to fourth ones and the ninth to twelfth ones of the intermediate samples (i(32) to i(35), i(40) to i(43)) associated with the second group as the first stored data (Dbo1), and to sequentially output the fifth to eighth ones and the thirteenth to sixteenth ones of the intermediate samples (i(36) to i(39), i(44) to i(47)) associated with the second group as the second stored data (Dbo2). The first multiplexer 12 is controlled to output the second stored data (Dbo2) as the first selection data (Dsel1), the second multiplexer 14 is controlled to output the input data (Din) as the first to-be-stored data (Dbi1), the third multiplexer 15 is controlled to output the operation data (Dop) as the second selection data (Dsel2), and the buffer 11 is controlled to store the first and second to-be-stored data (Dbi1, Dbi2). Accordingly, based on the intermediate samples (i(32) to i(47)) associated with the second group, the butterfly operator 13 sequentially obtains first to fourth ones and ninth to twelfth ones of sixteen final samples (f(32) to f(35), f(40) to f(43)) associated with the second group as the operation data (Dop), and sequentially obtains fifth to eighth ones and thirteenth to sixteenth ones of the final samples (f(36) to f(39), f(44) to f(47)) associated with the second group as the second to-be-stored data (Dbi2). Based on the first to fourth ones and the ninth to twelfth ones of the final samples (f(32) to f(35), f(40) to f(43)) associated with the second group, the multiplier 16 sequentially obtains first to fourth ones and ninth to twelfth ones of sixteen output samples (c(32) to c(35), c(40) to c(43)) associated with the second group as the output data (Dout). The first to eighth ones of the samples (b(16) to b(23)) of the third group and the fifth to eighth ones and the thirteenth to sixteenth ones of the final samples (f(36) to f(39), f(44) to f(47)) associated with the second group are stored in the buffer 11. Here, $f(z1+32)=i(z1+32)+i(z1+36)$, $f(z1+36)=i(z1+32)-i(z1+36)$, $f(z1+40)=i(z1+40)+i(z1+44)$, $f(z1+44)=i(z1+40)-i(z1+44)$, $c(z1+32)=f(z1+32)$, and $c(z1+40)=f(z1+40)\times W^{8z1}$, where $0 \leq z1 \leq 3$.

As shown in FIG. 16, in the time periods (T42, T43), ninth to sixteenth ones of the samples (b(24) to b(31)) of the third group are sequentially provided as the input data (Din). The buffer 11 is controlled to sequentially output the first to eighth ones of the samples (b(16) to b(23)) of the third group as the first stored data (Dbo1), and to sequentially output the fifth to eighth ones and the thirteenth to sixteenth ones of the final samples (f(36) to f(39), f(44) to f(47)) associated with the second group as the second stored data (Dbo2). The first multiplexer 12 is controlled to output the input data (Din) as the first selection data (Dsel1), the second multiplexer 14 is controlled to output the operation data (Dop) as the first to-be-stored data (Dbi1), the third multiplexer 15 is controlled to output the second stored data (Dbo2) as the second selection data (Dsel2), and the buffer 11 is controlled to store the first and second to-be-stored data (Dbi1, Dbi2). Accordingly, based on the samples (b(16) to b(31)) of the third group, the butterfly operator 13 sequentially obtains first to eighth ones of sixteen intermediate samples (i(16) to i(23)) associated with the third group as the operation data (Dop), and sequentially obtains ninth to sixteenth ones of the intermediate samples (i(24) to i(31)) associated with the third group as the second to-be-stored data (Dbi2). Based on the fifth to eighth ones and the thirteenth to sixteenth ones of the final samples (f(36) to f(39), f(44) to f(47)) associated with the second group, the multiplier 16 sequentially obtains fifth to eighth ones and thirteenth to sixteenth ones of the output samples (c(36) to c(39), c(44) to c(47)) associated with the second group as the output data (Dout). The intermediate samples (i(16) to i(31)) associated with the third group are stored in the buffer 11. Here, $i(z1+16)=b(z1+16)+b(z1+24)$, $i(z2+24)=b(z2+16)-b(z2+24)$, $i(z3+24)=-j[b(z3+16)-b(z3+24)]$, $c(z2+36)=f(z2+36)\times W^{16z2}$, and $c(z2+44)=f(z2+44)\times W^{24z2}$, where $0 \leq z1 \leq 7$, $0 \leq z2 \leq 3$ and $4 \leq z3 \leq 7$.

Since how the third butterfly module 23 (see FIG. 6) is controlled to generate sixteen output samples of each of the third to eighth groups can be inferred from the description above with reference to FIGS. 16 and 17, details thereof are omitted for the sake of brevity. The output samples (c(0) to c(127)) associated with the first to eighth groups and generated by the third butterfly module 23 (see FIG. 6) are obtained by performing the radix-$2^2$ butterfly operation on the second stage processed samples (b(0) to b(127)) of the first symbol, and are referred to as third stage processed samples of the first symbol hereinafter. Since how the third butterfly module 23 (see FIG. 6) is controlled to generate the third stage processed samples (c(0) to c(127)) of the $z^{th}$ symbol can be inferred from the description above, details thereof are omitted for the sake of brevity, where $z \geq 2$.

It is noted that, in this embodiment, since the third butterfly module 23 is controlled to repeat its operation every eight time periods from the time period (T40), it is relatively easy to modularize the control logic of the third butterfly module 23. In addition, in other embodiments, (a) three single-port memories and a single-port register file, (b) four single-port memories, (c) a single-port memory and three single-port register files, or (d) four single-port register files may be used as the first to fourth buffer units 111-114 of the buffer 11 of the third butterfly module 23, or a multi-port memory may be used as the buffer 11 of the third butterfly module 23. Preferably, each of the first to fourth buffer units 111-114 of the buffer 11 of the third butterfly module 23 is a single-port memory when it needs to have multiple memory spaces, and is a single-port register file otherwise.

Figure 18:
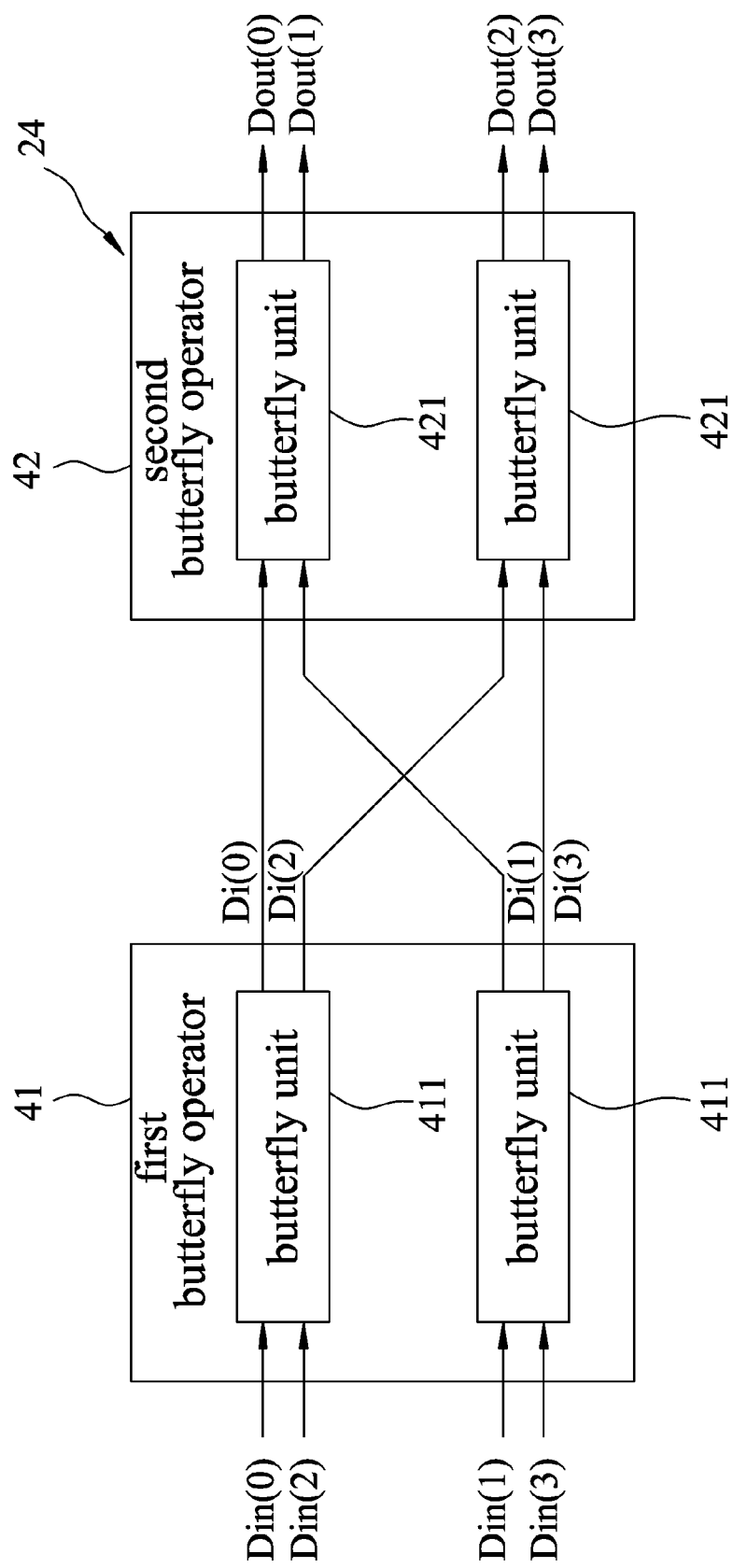
FIG. 18 is a schematic block diagram illustrating a fourth butterfly module of the pipelined FFT processor of the first embodiment shown in FIG. 6.

Referring to FIG. 18, the fourth butterfly module 24 performs the radix-$2^2$ butterfly operation, and includes a first butterfly operator 41 and a second butterfly operator 42. The first butterfly operator 41 receives input data (Din), and performs the radix-2 butterfly operation on the input data (Din) to generate intermediate data (Di). The second butterfly operator 42 is coupled to the first butterfly operator 41 for receiving the intermediate data (Di) therefrom, and performs the radix-2 butterfly operation on the intermediate data (Di) to generate output data (Dout).

In this embodiment, each of the input data (Din), the intermediate data (Di) and the output data (Dout) has four parallel samples.

In this embodiment, the first butterfly operator 41 of the fourth butterfly module 24 includes two butterfly units 411, and the second butterfly operator 42 of the fourth butterfly module 24 includes two butterfly units 421. The samples of the input data (Din(0) to Din(3)) are arranged in pairs. The samples of each pair (Din(z), Din(z+2)) are processed by a respective butterfly unit 411 of the first butterfly operator 41 to obtain two respective samples of the intermediate data (Di(z), Di(z+2)), where $0 \le z \le 1$, Di(z)=Din(z)+Din(z+2), and Di(z+2)={Din(z)−Din(z+2) or −j[Din(z)−Din(z+2)]}. The samples of the intermediate data (Di(0) to Di(3)) are arranged in pairs. The samples of each pair (Di(2z), Di(2z+1)) are processed by a respective butterfly unit 421 of the second butterfly operator 42 to obtain two respective samples of the output data (Dout(2z), Dout(2z+1)), where $0 \le z \le 1$, Dout(2z)=Di(2z)+Di(2z+1), and Dout (2z+1)=Di(2z)−Di(2z+1).

Referring to FIGS. 18 and 19, operations of the fourth butterfly module 24 are described below. In the time periods (T36 to T67), the fourth butterfly module 24 sequentially receives the third stage processed samples (c(0) to c(127)) of the first symbol as the input data (Din), sequentially generates one-hundred-and-twenty-eight intermediate samples (i(0) to i(127)) associated with the first symbol as the intermediate data (Di) based on the third stage processed samples (c(0) to c(127)) of the first symbol, and sequentially generates one-hundred-and-twenty-eight output samples (X(0) to X(127)) associated with the first symbol as the output data (Dout) based on the intermediate samples (i(0) to i(127)) associated with the first symbol. Here, i(4z1)=c(4z1)+c(4z1+2), i(4z1+1)=c(4z1+1)+c(4z1+3), i(4z1+2)=c(4z1)−c(4z1+2), i(4z1+3)=−j[c(4z1+1)−c(4z1+3)], X(<u>4z1</u>)=i(4z1)+i(4z1+1), X(<u>4z1+1</u>)=i(4z1)−i(4z1+1), X(<u>4z1+2</u>)=i(4z1+2)+i(4z1+3), and X(<u>4z1+3</u>)=i(4z1+2)−i(4z1+3), where $0 \le z1 \le 31$ and <u>z</u> is bit reversal of z.

The output samples (X(0) to X(127)) associated with the first symbol and generated by the fourth butterfly module 24 are obtained by performing the radix-$2^2$ butterfly operation on the third stage processed samples (c(0) to c(127)) of the first symbol (i.e., obtained by performing the FFT on the original samples (x(0) to x(127)) of the first symbol), and are referred to as final stage processed samples of the first symbol hereinafter. Since how the fourth butterfly module 24 operates to generate the final stage processed samples (X(0) to X(127)) of the $z^{th}$ symbol can be inferred from the description above with reference to FIG. 19, details thereof are omitted for the sake of brevity, where $z \ge 2$.

Figure 20:
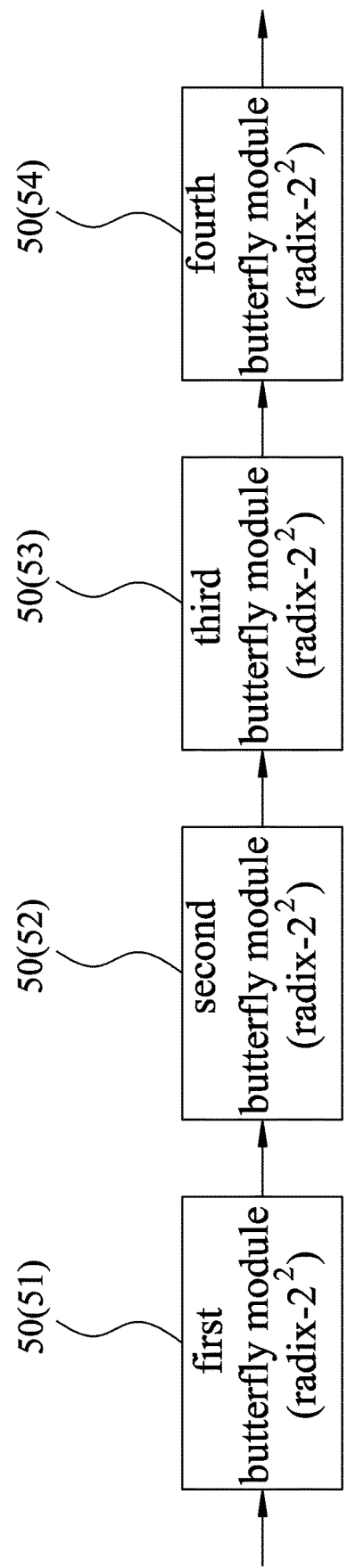
FIG. 20 is a schematic block diagram illustrating a second embodiment of a pipelined FFT processor according to this invention.
Figure 21:
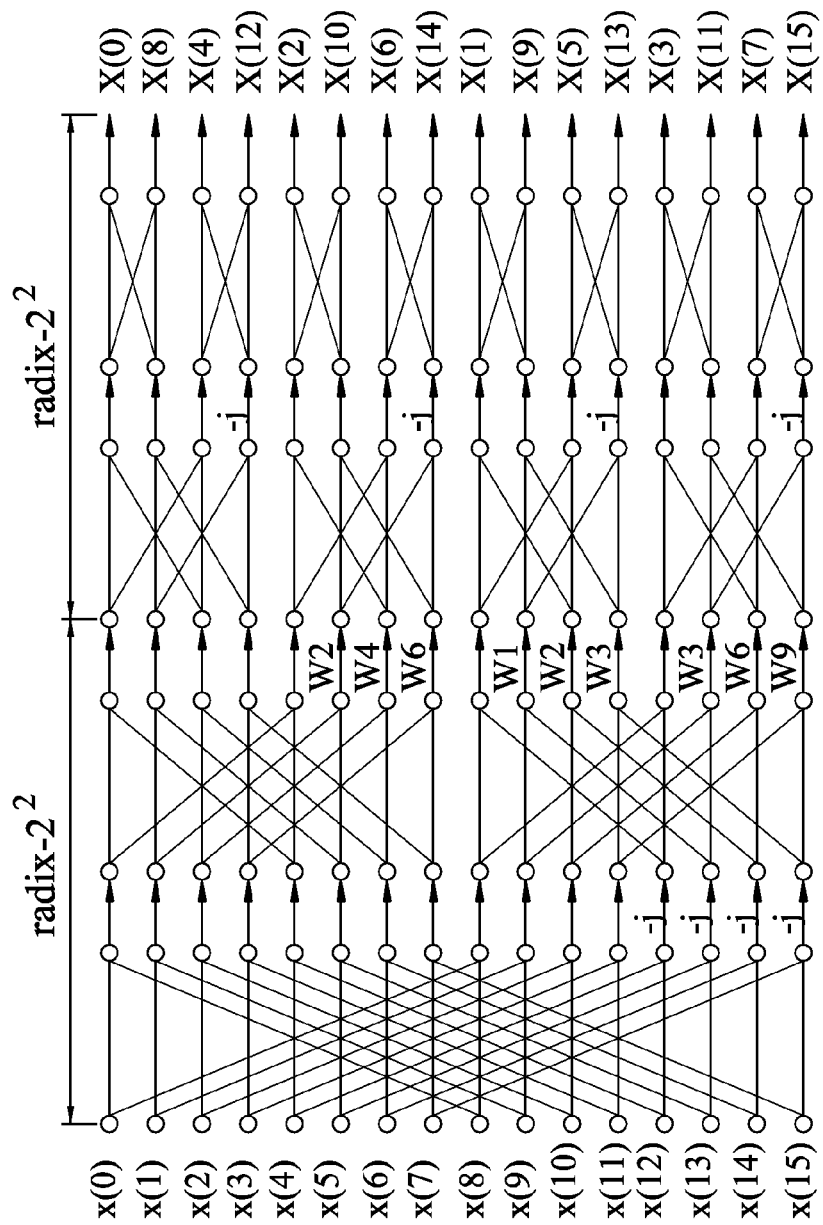
FIG. 21 is a schematic diagram illustrating 16-point FFT computation performed by an example of the second embodiment shown in FIG. 20.

Referring to FIG. 20, a second embodiment of a pipelined FFT processor according to this invention is adapted to perform an N-point FFT, where $N=2^K$ and K is an even integer larger than or equal to four. The pipelined FFT processor includes a number (M) of cascaded butterfly modules 50, where M=K/2 with each of the butterfly modules 50 performing a radix-$2^2$ butterfly operation, where each of first to (M−1)$^{th}$ ones of the butterfly modules 50 is a folded butterfly module shown in FIG. 1. In the configuration of the pipelined FFT processor shown in FIG. 20, when M=4 (i.e., K=8 and N=256), where for the sake of simplicity, the $z^{th}$ one of the butterfly modules 50 is referred to as the $z^{th}$ butterfly module 51-54 hereinafter, where $1 \le z \le 4$. FIG. 21 depicts 16-point FFT computation on data samples x(0) to x(15) performed by an example of the pipelined FFT processor when M=2 (i.e., K=4 and N=16). Details of this embodiment in an exemplary scenario in which M=4 (i.e., K=8 and N=256) are described below. Details of this embodiment in a scheme in which M equals a number other than four can be inferred from the description below, and are omitted for the sake of brevity.

Referring to FIG. 20, each of the first and second butterfly modules 51, 52 performs the radix-$2^2$ butterfly operation, and is the folded butterfly module shown in FIGS. 1, 2 and 5, where P=8. The third butterfly module 53 performs the radix-$2^2$ butterfly operation, and is the folded butterfly module shown in FIGS. 1 and 3 to 5, where P=8. Since how the first to third butterfly modules 51-53 are controlled can be inferred from the description above in connection with the second and third butterfly modules 22, 23 (see FIG. 6), details thereof are omitted for the sake of brevity.

Figure 22:
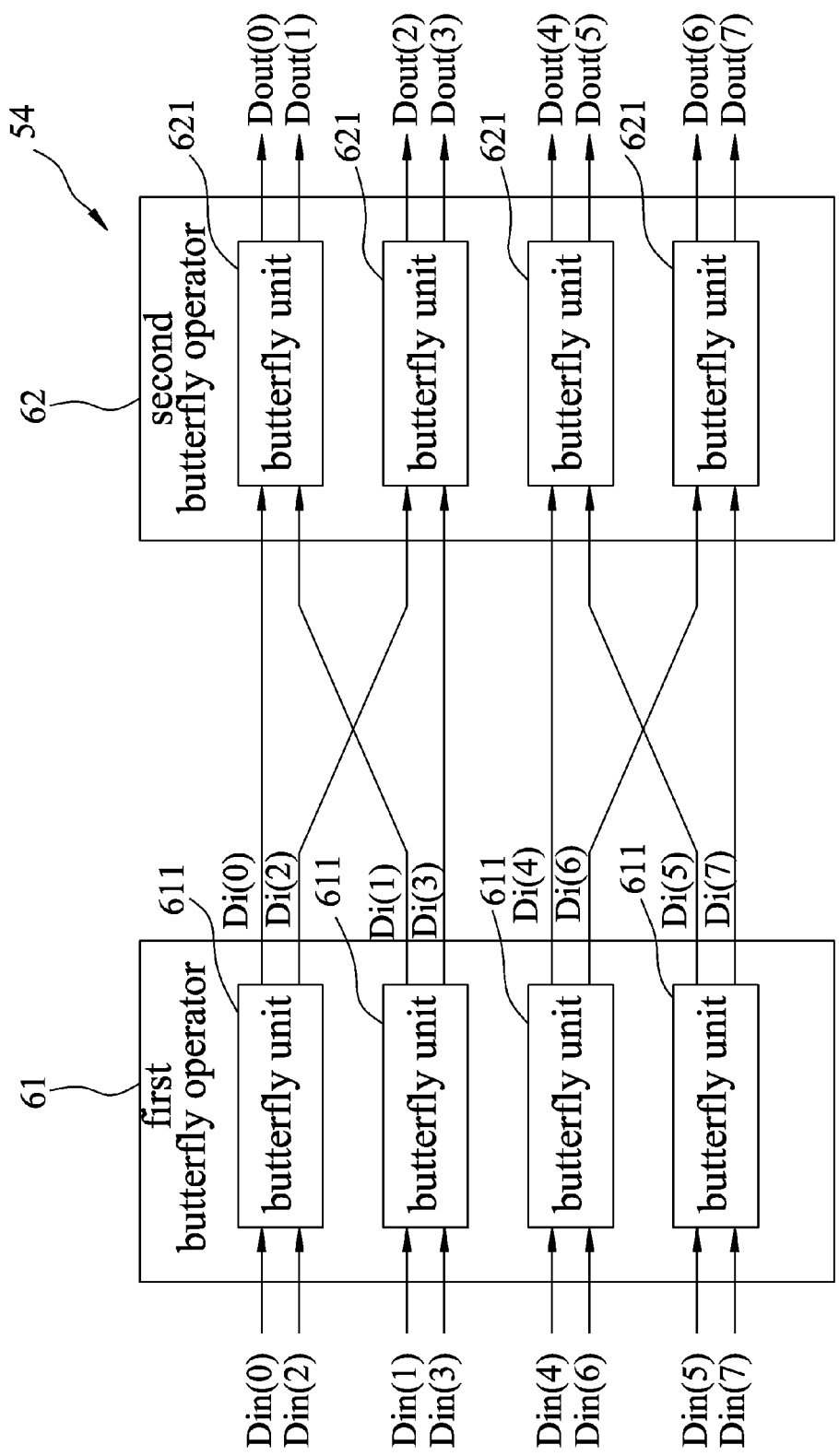
FIG. 22 is a schematic block diagram illustrating a fourth butterfly module of the pipelined FFT processor of the second embodiment shown in FIG. 20.

Referring to FIG. 22, the fourth butterfly module 54 performs the radix-$2^2$ butterfly operation, and includes a first butterfly operator 61 and a second butterfly operator 62. The first butterfly operator 61 receives input data (Din) having samples (Din (0) to Din (7)), and performs the radix-2 butterfly operation on the input data (Din) to generate intermediate data (Di) having samples (Di(0) to Di(7)). The second butterfly operator 62 is coupled to the first butterfly operator 61 for receiving the intermediate data (Di) therefrom, and performs the radix-2 butterfly operation on the intermediate data (Di) to generate output data (Dout) having samples (Dout (0) to Dout (7)).

In this embodiment, each of the input data (Din), the intermediate data (Di) and the output data (Dout) has eight parallel samples, the first butterfly operator 61 of the fourth butterfly module 54 includes four butterfly units 611, and the second butterfly operator 62 of the fourth butterfly module 54 includes four butterfly units 621. Since operations of the fourth butterfly module 54 can be inferred from the description above in connection with the fourth butterfly module 24 (see FIG. 18), details thereof are omitted for the sake of brevity.

In view of the above, when the folded butterfly module shown in FIG. 1 is properly controlled, the butterfly operator 13 thereof can perform the radix-2 butterfly operation twice to achieve the radix-$2^2$ butterfly operation, thereby increasing utilization of the butterfly units 131 (see FIGS. 2 to 4) of the butterfly operator 13 thereof.

While this invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A folded butterfly module configured to perform a radix-$2^2$ butterfly operation, said folded butterfly module comprising:
   a buffer for receiving first to-be-stored data and second to-be-stored data, and operable to store the first and second to-be-stored data and to output first stored data and second stored data;
   a first multiplexer coupled to said buffer for receiving the second stored data therefrom, configured to receive input data, and being operable to output one of the second stored data and the input data as first selection data;

a butterfly operator coupled to said buffer and said first multiplexer for receiving the first stored data and the first selection data respectively therefrom, said butterfly operator being operable to perform a radix-2 butterfly operation on the first stored data and the first selection data to generate operation data and the second to-be-stored data;

a second multiplexer coupled to said butterfly operator and said buffer, configured to receive the input data and to receive the operation data from said butterfly operator, and being operable to output one of the input data and the operation data as the first to-be-stored data;

a third multiplexer coupled to said butterfly operator and said buffer for receiving the operation data and the second stored data respectively therefrom, and being operable to output one of the operation data and the second stored data as second selection data; and a multiplier coupled to said third multiplexer for receiving the second selection data therefrom, said multiplier being operable to generate output data that equals a product of the second selection data and predetermined twiddle data.

2. The folded butterfly module of claim 1, wherein said buffer includes:

a first buffer unit, a second buffer unit, a third buffer unit and a fourth buffer unit, each of which is operable to store data received thereby and to output data stored thereby;

a first commutating unit coupled to said first to fourth buffer units, configured to receive the first and second to-be-stored data, and being operable to output the first and second to-be-stored data respectively to two of said first to fourth buffer units; and a second commutating unit coupled to said first to fourth buffer units for receiving the data outputted thereby, and being operable to output the data received from two of the first to fourth buffer units respectively as the first and second stored data.

3. The folded butterfly module of claim 2, wherein each of said first to fourth buffer units of said buffer is a single-port memory.

4. The folded butterfly module of claim 2, wherein each of said first and fourth buffer units of said buffer is a single-port memory, and each of said second and third buffer units of said buffer is a single-port register file.

5. The folded butterfly module of claim 2, wherein each of said first to fourth buffer units of said buffer is a single-port register file.

6. The folded butterfly module of claim 1, wherein each of the input data, the first and second to-be-stored data, the first and second stored data, the first and second selection data, the operation data, the twiddle data and the output data has a number (P) of samples, where $P=2^Q$, Q is an integer larger than or equal to zero, and the samples are parallel when $Q \geq 1$.

7. The folded butterfly module of claim 6, wherein, when $Q \geq 3$, said butterfly operator is operable to pair the samples of the first stored data with the samples of the first selection data, to process the samples of each pair to obtain a respective one of the samples of the operation data and a respective one of the samples of the second to-be-stored data, and to change the pairing of the samples of the first stored data and the first selection data.

8. A pipelined fast Fourier transform (FFT) processor configured to perform an N-point FFT, where $N=2^K$ and K is an integer larger than or equal to four, said pipelined FFT processor comprising:

a number (M) of cascaded butterfly modules;

wherein, when K is an even number, M=K/2, each of said butterfly modules performs a radix-$2^2$ butterfly operation, and each of first to $(M-1)^{th}$ ones of said butterfly modules is a folded butterfly module according to claim 1; and wherein, when K is an odd number, M=(K+1)/2, said first one of said butterfly modules performs a radix-2 butterfly operation, each of second to $M^{th}$ ones of said butterfly modules performs the radix-$2^2$ butterfly operation, and each of said second to $(M-1)^{th}$ ones of said butterfly modules is the folded butterfly module according to claim 1.

9. A control method for controlling a folded butterfly module according to claim 1, the control method comprising:

(A) controlling the second multiplexer to output the input data as the first to-be-stored data, and controlling the buffer to store the first to-be-stored data;

(B) controlling the buffer to output the first stored data, controlling the first multiplexer to output the input data as the first selection data, controlling the second multiplexer to output the operation data as the first to-be-stored data, and controlling the buffer to store the first and second to-be-stored data;

(C) controlling the buffer to output the first and second stored data, controlling the first multiplexer to output the second stored data as the first selection data, controlling the second multiplexer to output the input data as the first to-be-stored data, controlling the third multiplexer to output the operation data as the second selection data, and controlling the buffer to store the first and second to-be-stored data; and (D) controlling the buffer to output the first and second stored data, controlling the first multiplexer to output the input data as the first selection data, controlling the second multiplexer to output the operation data as the first to-be-stored data, controlling the third multiplexer to output the second stored data as the second selection data, and controlling the buffer to store the first and second to-be-stored data.

10. The control method of claim 9, wherein the buffer includes a first buffer unit, a second buffer unit, a third buffer unit and a fourth buffer unit, and wherein in (C) and (D), the buffer is controlled to perform the following simultaneously:

storing the first and second to-be-stored data respectively into two of the first to fourth buffer units; and outputting the first and second stored data respectively from the other two of the first to fourth buffer units.

* * * * *